(12) United States Patent  
Ananthanarayanan et al.

(10) Patent No.: US 8,103,247 B2
(45) Date of Patent: Jan. 24, 2012

(54) AUTOMATED SECURE PAIRING FOR WIRELESS DEVICES

(75) Inventors: Ganesh Ananthanarayanan, Bangalore (IN); Sean Blagsvedt, Bangalore (IN); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 11/555,093

(22) Filed: Oct. 31, 2006

(65) Prior Publication Data

US 2008/0102793 A1 May 1, 2008

(51) Int. Cl.
*H04M 1/66* (2006.01)

(52) U.S. Cl. ............... 455/411; 455/410; 455/435.1

(58) Field of Classification Search .............. None
See application file for complete search history.

(56) References Cited

U.S. PATENT DOCUMENTS

| | | | |
|---|---|---|---|
| 6,295,551 B1 | 9/2001 | Roberts et al. | |
| 6,360,250 B1 | 3/2002 | Anupam et al. | |
| 6,688,273 B2 | 2/2004 | Ederer | |
| 6,732,145 B1 | 5/2004 | Aravamudan et al. | |
| 6,982,982 B1 | 1/2006 | Barker, Jr. et al. | |
| 7,058,014 B2 | 6/2006 | Sim | |
| 7,058,722 B2 | 6/2006 | Ikami et al. | |
| 7,076,553 B2 | 7/2006 | Chan et al. | |
| 7,149,776 B1 | 12/2006 | Roy et al. | |
| 7,284,127 B2 * | 10/2007 | Gehrmann | 713/169 |
| 7,287,054 B2 | 10/2007 | Lee et al. | |
| 7,580,521 B1 * | 8/2009 | Spies et al. | 380/44 |
| 2002/0032731 A1 | 3/2002 | Qian et al. | |
| 2002/0035603 A1 | 3/2002 | Lee et al. | |
| 2002/0083134 A1 | 6/2002 | Bauer, Jr. et al. | |
| 2002/0138624 A1 | 9/2002 | Esenther | |
| 2002/0178385 A1 * | 11/2002 | Dent et al. | 713/202 |
| 2002/0198941 A1 | 12/2002 | Gavrilescu et al. | |
| 2003/0050009 A1 | 3/2003 | Kurisko et al. | |
| 2003/0195924 A1 | 10/2003 | Franke et al. | |
| 2004/0117623 A1 * | 6/2004 | Kalogridis et al. | 713/165 |
| 2004/0172476 A1 | 9/2004 | Chapweske | |
| 2004/0177152 A1 | 9/2004 | Aviran | |
| 2004/0225716 A1 | 11/2004 | Shamir et al. | |
| 2005/0009469 A1 * | 1/2005 | Kotola | 455/41.2 |
| 2005/0105496 A1 | 5/2005 | Ambrosino | |
| 2005/0135347 A1 | 6/2005 | Creamer et al. | |

(Continued)

FOREIGN PATENT DOCUMENTS

EP 1635508 3/2006

OTHER PUBLICATIONS

"Co-operative Downloading in Vehicular Ad-Hoc Wireless Networks" retrieved at <<http://nrl.cs.ucla.edu/shanky/Papers/cooperative-wons05.pdf>>, pp. 1-10.

(Continued)

*Primary Examiner* — Rafael Pérez-Gutiérrez
*Assistant Examiner* — Daniel Nobile
(74) *Attorney, Agent, or Firm* — Lee & Hayes, PLLC

(57) ABSTRACT

Systems, methods, and/or techniques ("tools") are described herein that relate to automated secure pairing for devices, and that relate to parallel downloads of content using devices. The tools for pairing the devices may perform authentication protocols that are based on addresses and on keys. The address-based authentication protocol may operate on address book entries maintained by the devices. The key-based authentication protocol may operate using a key exchange between the devices.

16 Claims, 15 Drawing Sheets

U.S. PATENT DOCUMENTS

| | | | |
|---|---|---|---|
| 2005/0157661 | A1 | 7/2005 | Cho |
| 2005/0254479 | A1 | 11/2005 | Chang et al. |
| 2006/0083187 | A1* | 4/2006 | Dekel .................. 370/310 |
| 2006/0095582 | A1 | 5/2006 | Nitya et al. |
| 2006/0117107 | A1 | 6/2006 | Shafron et al. |
| 2006/0130054 | A1 | 6/2006 | Bocking et al. |
| 2007/0178882 | A1* | 8/2007 | Teunissen et al. ........ 455/411 |
| 2007/0251997 | A1* | 11/2007 | Brown et al. ........... 235/380 |
| 2008/0320587 | A1 | 12/2008 | Vauclair et al. |

OTHER PUBLICATIONS

Friedman, "Caching Web Services in Mobile Ad-Hoc Networks: Opportunities and Challenges", retrieved at <<http://delivery.acm.org/10.1145/590000/584508/p90-friedman.pdf?key1=584508&key2=5491025511&coll=GUIDE&dI=portal, ACM &CFID=11111111&CFTOKEN=2222222, POMC'02, Oct. 30-31, 2002, ACM, pp. 90-96.

Janssens, "Preliminary study: Bluetooth Security", retrieved at <<http://student.vub.ac.be/~sijansse/2e%20lic/BT/Voorstudie/PreliminaryStudy.pdf>> Jan. 9, 2005, pp. 1-28.

Luo, et al., "UCAN: A Unified Cellular and Ad-Hoc Network Architecture", retrieved at <<http://delivery.acm.org/10.1145/940000/939021/p353-luo.pdf?key1=939021&key2=0662611611&coll=GUIDE&dI=GUIDE&CFID=11111111&CFTOKEN=2222222>>, Mobicom'03, Sep. 14-19, 2003, ACM, 2003, pp. 353-367.

Nandan, et al., "Co-operative Downloading in Vehicular Ad-Hoc Wireless Networks", Second Annual Conference on Wireless On-demand Network Systems and Services (WONS'05), IEEE, 2005, pp. 32-41.

Nicholson, et al., "LoKey: Leveraging the SMS Network in Decentralized, End-to-End Trust Establishment", retrieved at <<http:www.eecs.umich.edu/~tonynich/pervasive_final.pdf>>, Springer-Verlag Berlin Heidelberg, 2006, pp. 202-219.

Zhu, et al., "Using Cooperative Multiple Paths to Reduce File Download Latency in Cellular Data Networks", retrieved at <<http://ieeexplore.ieee.org/iel5/10511/33289/01578208.pdf?isNumber=>>, IEEE Globecom 2005, IEEE, 2005, pp. 2480-2484.

* cited by examiner

AUTOMATED SECURE PAIRING FOR WIRELESS DEVICES

BACKGROUND

As wireless devices become more prevalent, users continually demand more functions and capabilities from these devices. More recently, wireless devices are increasingly available with broadband internet connectivity. This availability opens new opportunities for users of such wireless devices. For example, in emerging markets around the world, users may not have access to personal computers with broadband internet connections, or may not wish to pay for general packet radio service (GPRS) connections. Instead, these users may opt to receive digital content via, for example, Bluetooth connections established between phones.

To pair two phones using conventional Bluetooth approaches, the users would typically put their respective phones into a discovery mode and locate the phones in proximity to one another. The users would then exchange pass codes, and enter the pass codes into the phones.

While adequate for their intended uses, these conventional approaches suffer drawbacks, chiefly the manual steps taken by the respective users in obtaining and entering the pass codes. Accordingly, automated approaches have been proposed, in which the devices automatically pair themselves with any devices in close enough proximity. While an improvement over manual approaches, these automated approaches may expose users and devices to viruses and other forms of malware. More specifically, these automated approaches may not authenticate the devices with which they are pairing. In this sense, the connections between the paired devices are not secured, and any malicious content stored on one paired device may readily migrate to another paired device over this unsecured connection.

SUMMARY

Systems, methods, and/or techniques ("tools") are described herein that relate to automated secure pairing for devices, and that relate to parallel downloads of content using devices. The tools for pairing the devices may perform authentication protocols that are based on addresses and on keys. The address-based authentication protocol may operate on address book entries maintained by the devices. The key-based authentication protocol may operate using a key exchange between the devices.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable or machine-readable instructions, and/or technique(s) as permitted by the context above and throughout the document.

BRIEF DESCRIPTIONS OF THE DRAWINGS

Tools related to performing automated secure pairing for wireless devices are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools provide for automated secure pairing for wireless devices. This discussion also describes other techniques and/or processes that may be performed by the tools.

Figure 1:
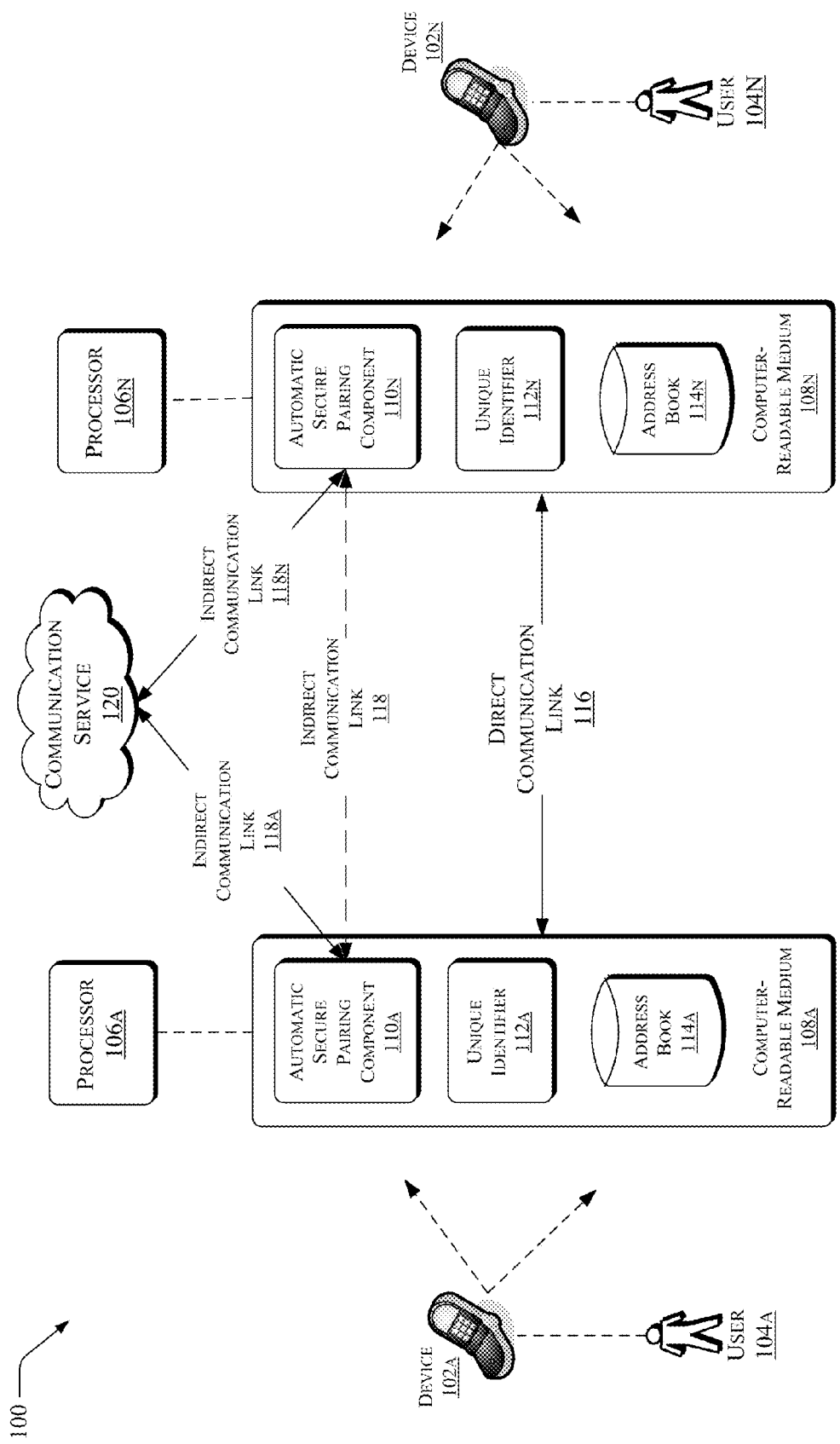
FIG. 1 is a combined block and flow diagram of an operating environment suitable for implementing automated secure pairing for wireless devices.

FIG. 1 illustrates an operating environment 100 suitable for performing automated secure pairing for wireless devices. The operating environment 100 may include one or more wireless devices 102. These devices 102 may be cellular telephones, smart phones, Personal Digital Assistants (PDAs), or the like. It is understood that implementations of the operating environment may include any number of different wireless devices, although FIG. 1 shows two wireless devices 102A and 102N only for convenience of illustration. Although FIG. 1 denotes these devices with similar reference numbers, it is noted that the two wireless devices 102A and 102N may be different types, makes, models, or brands of devices.

The wireless devices 102 are associated with respective users 104. For convenience of illustration, FIG. 1 shows two users at 104A and 104N, but the operating environment may support any number of users.

In general, the wireless devices 102 may be computer-based systems that include one or more processor(s) 106. FIG. 1 shows two processors 106A and 106N, associated respectively with the wireless devices 102A and 102N.

The wireless devices may include one or more instances of computer-readable storage media 108, which are coupled to communicate with the processors. The computer-readable media may contain instructions that, when executed by the processor, perform any of the tools or related functions as described herein. The processor may be configured to access and/or execute the instructions embedded or encoded onto the computer-readable media. The processor may also be categorized or characterized as having a given architecture. The processors 106A and 106N may be different types of processors, depending on the architecture of the devices 102.

The computer-readable media 108 may include one or more instances of automatic secure pairing components 110. FIG. 1 shows respective automatic secure pairing components 110A and 110N, associated respectively with the devices 102A and 102N. The automatic secure pairing components may be implemented as one or more software modules that, when loaded into the processors 106 and executed, cause the devices 102 to perform the various functions described herein.

The wireless devices may be associated with respective unique identifiers 112N, by which communications may be addressed to the wireless devices. For example, if the wireless devices include telephone capabilities, the unique identifier may be a telephone number. Other examples of unique identifiers may include e-mail addresses, user names or screen names for instant messaging (IM) applications, electronic serial numbers (ESNs), or the like. In any event, the computer-readable media may store representations of the unique identifiers associated with the wireless devices, denoted respectively at 112A and 112N.

The computer-readable media 108 may also include one or more instances of data structures that store contents of an address book or other similar list of contacts. FIG. 1 denotes these data structures as address books 114, and shows address books 114A and 114N associated respectively with wireless devices 102A and 102N. The term "address book" is chosen only for ease of description, but not to limit possible implementations of the operating environment 100. Generally, these data structures store one or more addresses or other unique identifiers corresponding to the devices 102.

As an example, assume that the wireless devices 102 have telephone capabilities, and that the users 104A and 104N have exchanged unique identifiers 112, e.g., telephone numbers. In this case, the address book 114A may include the telephone number of the device 102N, and the address book 114N may include the telephone number of the device 102A. In this example, the users may be assumed to know and trust each other, at least to the extent that they are willing to exchange personal information, such as phone numbers.

The wireless devices may communicate with one another via one or more direct communication links 116 and one or more indirect communication links 118. The direct communication links 116 enable the wireless devices to communicate with one another in peer-to-peer (P2P) fashion, without the communications passing through an intermediate network. Examples of technologies suitable for implementing the direct communication links include, but are not limited to, Bluetooth and WiFi technologies.

Turning to the indirect communication links 118, these links enable the wireless devices to communicate with one another through some intermediate network or service provided and/or maintained by a third party. FIG. 1 denotes such a network or service generally at communication service 120. Thus, communications from one wireless device to another passes through the communication service. For convenience only, FIG. 1 denotes communications between the wireless device 102A and the communication service at 118A, and communications between the communication service and the wireless device 102N communication service at 118N. For ease of discussion only, but not limitation, examples of the indirect communication links may include links that enable telephones to communicate with one another, links that enable devices to communicate using the Short Message Service (SMS), e-mail links, or the like.

Figure 2:
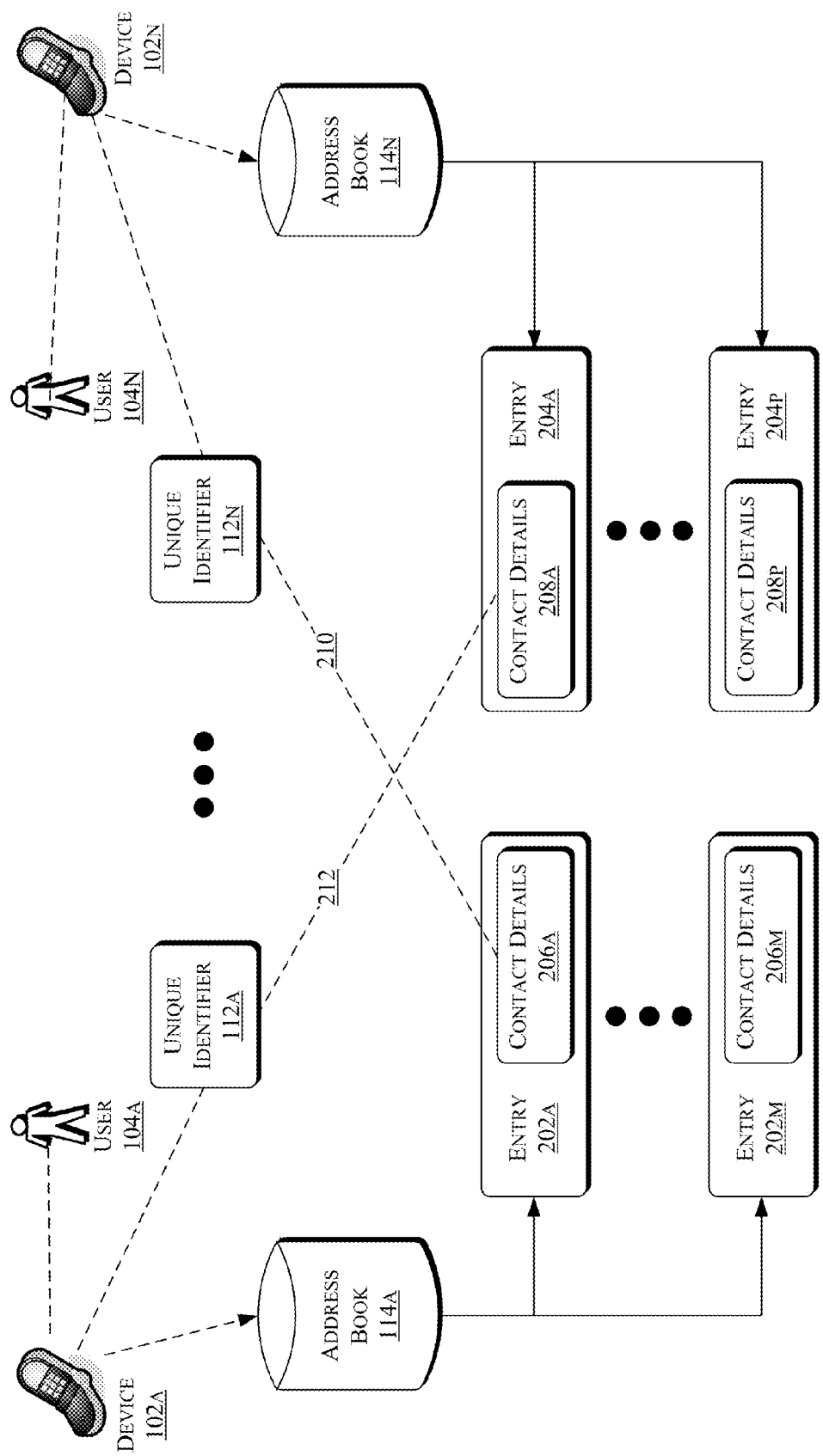
FIG. 2 is a block diagram illustrating further details of address books or other contact lists suitable for implementing automated secure pairing for wireless devices.

Having described the operating environment 100 in FIG. 1, the discussion now turns to a more detailed description of the address books and other related data structures, now presented with FIG. 2.

FIG. 2 illustrates further details of address books or other contact lists suitable for implementing automated secure pairing for wireless devices. Elements previously described in FIG. 1 are in denoted by the same reference numbers in FIG. 2 for convenience only.

Turning to the address books 114 in more detail, the address books may contain one or more entries 202 and 204. For convenience only, FIG. 2 shows the address book 114A having two entries 202A and 202M, and the address book 114N having two entries 204A and 204P, but it is noted that the address books may contain any number of entries. From the perspective of a given address book 114, respective ones of the entries may correspond to other devices 102 or other users 104. For example, turning to the address book 114A in particular, one of the entries 202 may contain contact information for the device 102N, and/or the user 104N.

Turning to the entries 202 and 204 in more detail, the entries may respectively contain one or more fields for storing contact details related to another device 102 and/or another user 104. These fields are denoted generally in FIG. 2 as contact details fields 206 and 208. More specifically, FIG. 2 shows the entry 202A associated with the contact details field 206A, and the entry 202M associated with the contact details field 206M. Additionally, FIG. 2 shows the entry 204A associated with the contact details field 208A, and the entry 204P associated with the contact details field 208P. Generally, the contact details fields 206 and 208 may contain any unique identifiers suitable for addressing the devices 102 and/or the users 104. Examples of such unique identifiers are shown at 112 in FIGS. 1 and 2, and may include e-mail addresses, user names or screen names for instant messaging (IM) applications, electronic serial numbers (ESNs), or the like. Additional examples of these unique identifiers may include telephone numbers, or any other identifier related to a network that offers addressable security.

In a non-limiting example as shown in FIG. 2, the entry 202A in the address book 114A includes a contact details field (e.g., 206A) that contains at least the unique identifier 112N associated with the device 102N, as indicated by the dashed line 210. Additionally, the entry 204A in the address book 114N includes a contact details field (e.g., 208A) that contains at least the unique identifier 112A associated with the device 102A, as indicated by the dashed line 212. The roles placed by these address book entries in securely pairing the wireless devices 102 are described herein.

Figure 3:
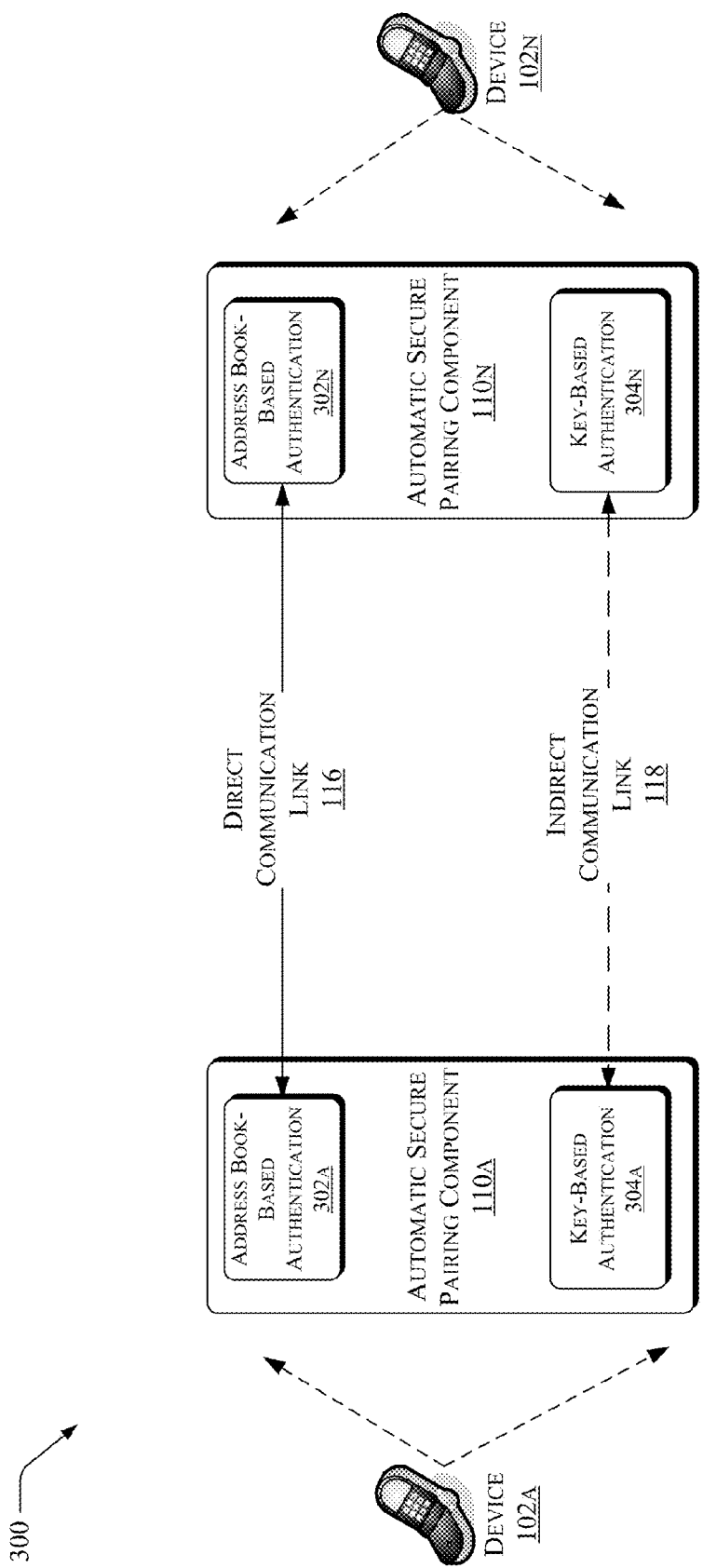
FIG. 3 is a combined block and flow diagram illustrating direct and indirect communication links and authentication components suitable for securely pairing the wireless devices.

Having described the address books 114, the discussion now turns to a description of different authentication schemes for automated secure pairing of wireless devices, now presented with FIG. 3.

FIG. 3 illustrates a combined block and flow block diagram 300, showing communication links and authentication components suitable for securely pairing the wireless devices. As shown in FIG. 3, at least the devices 102A and 102N are coupled to communicate via the direct communication link 118 and via the indirect communication link 118. More specifically, FIG. 3 shows the respective automatic secure pairing components 110A and 110N as engaged in the pairing operation.

It is noted that the term "pairing" is used herein only for convenience, but not for limitation. It is specifically noted that two or more devices 102 may be securely coupled to communicate with one another using the tools and techniques described herein. Thus, FIGS. 1-3 shows two devices 102 only for ease of illustration and description.

Turning to the direct communication link 116, the device 102A may include a component 302A for authenticating one or more other devices 102N based on entries in address books or other similar data structures as contained within the device 102A. Similarly, the device 102N may include a component 302N for authenticating one or more other devices 102A based on entries in address books or other similar data structures as contained within the device 102N. For convenience only, these address book authentication components 302 are shown as part of the automatic secure pairing component 110, but it is noted that the components 302 may be implemented separately from the components 110.

Turning to the indirect communication link 118, the device 102A may include a component 304A for authenticating one or more other devices 102N using keys exchanged with the device 102A. Similarly, the device 102N may include a component 302N for authenticating one or more other devices 102A using keys exchanged with the device 102N. For convenience only, these key-based authentication components 304 are shown as part of the automatic secure pairing component 110, but it is noted that the components 304 may be implemented separately from the components 110.

Figure 4:
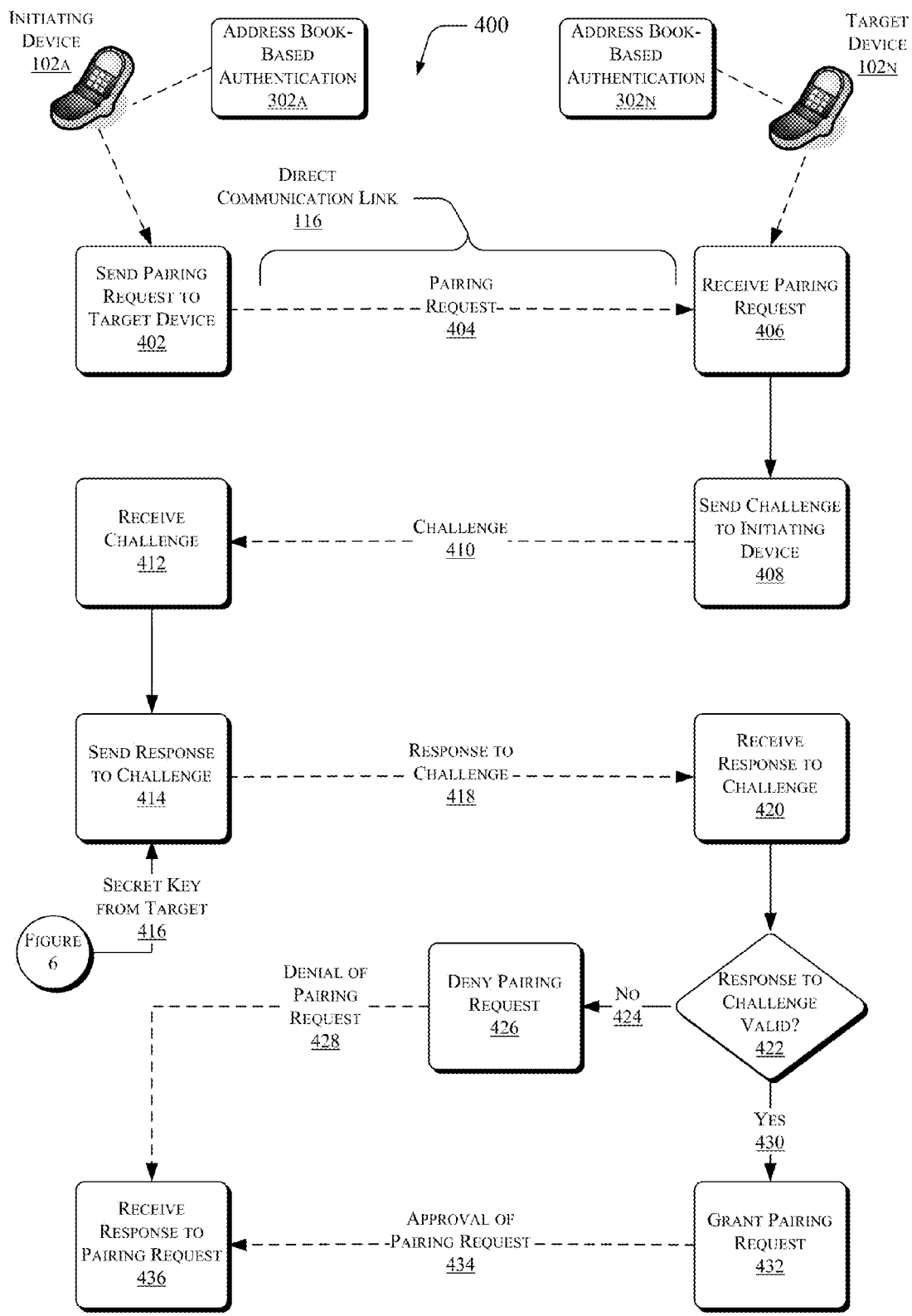
FIG. 4 is a flow diagram, illustrating a process for performing address-book based authentication between an initiating device and a target device.
Figure 5:
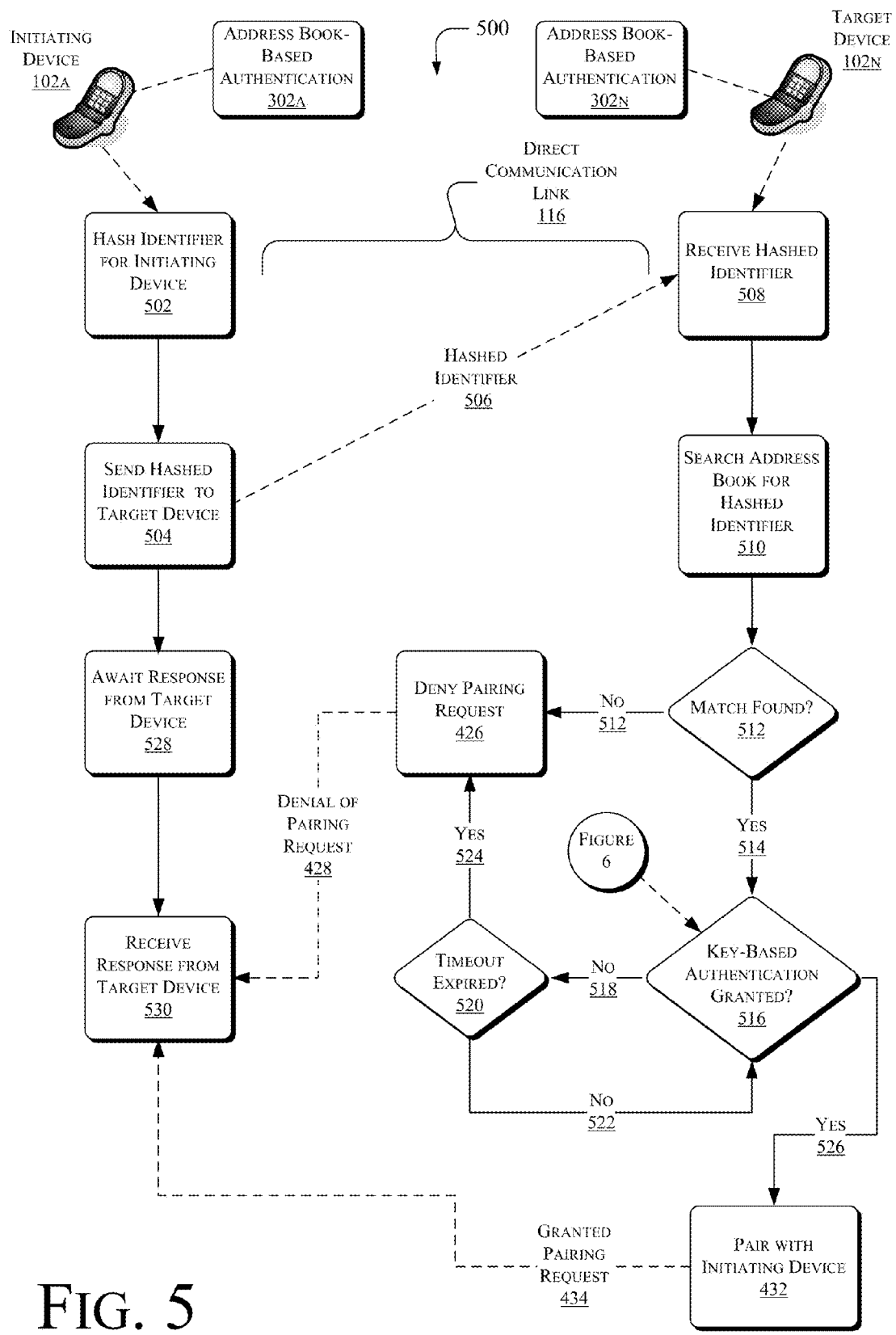
FIG. 5 is a flow diagram, illustrating further details of the authentication process shown in FIG. 4.
Figure 6:
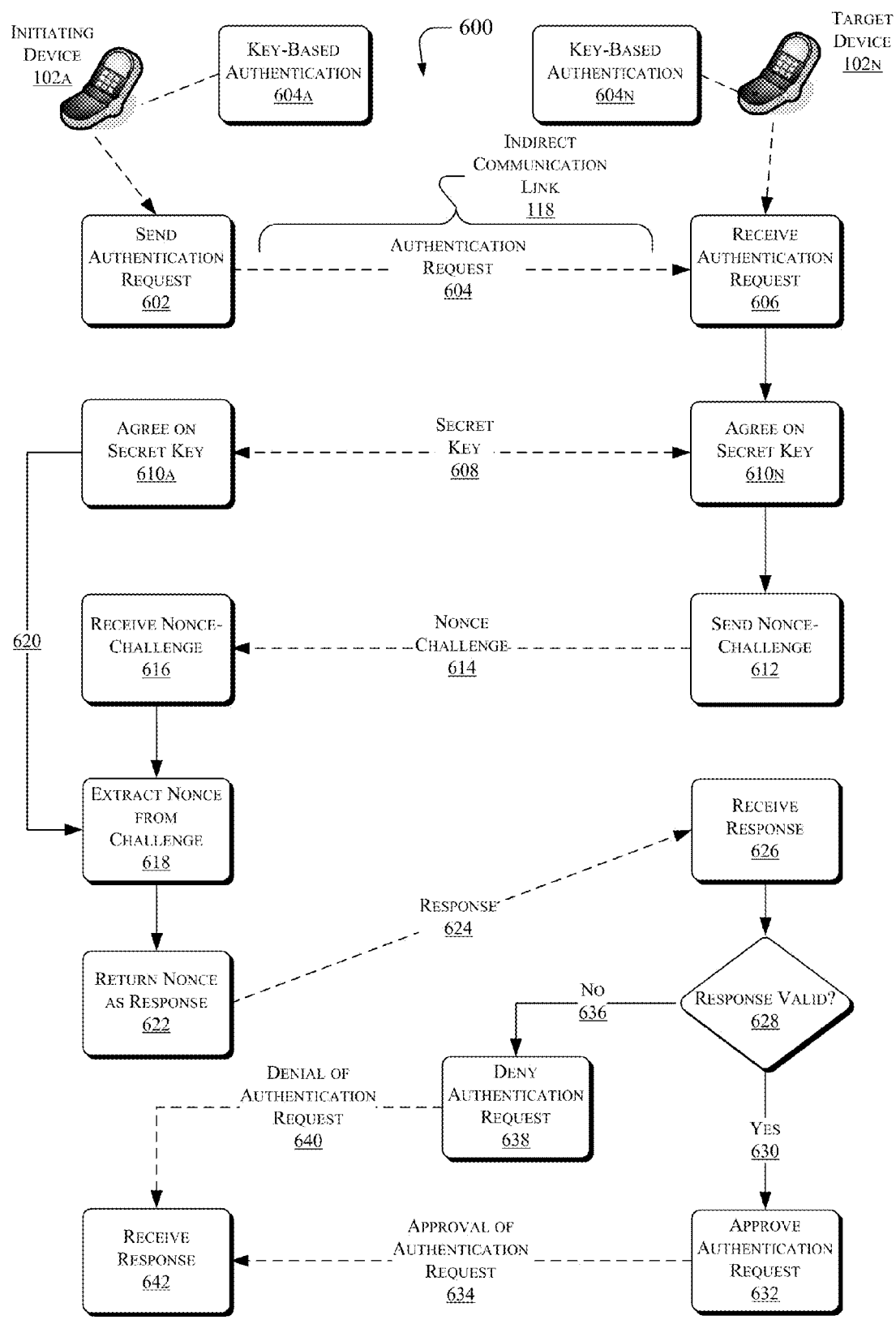
FIG. 6 is a flow diagram, illustrating a process for performing key-based authentication between the initiating device and the target device.

Having introduced the address book-based authentication components 302 and the key-based authentication components 304, the discussion now turns to a more detailed description of process and data flows related to these components, presented with FIGS. 4-6. More specifically, FIGS. 4-5 pertain to process and data flows that may be performed by the address book-based authentication components 302, while FIG. 7 pertains to process and data flows that may be performed by the key-based authentication components 304.

FIG. 4 illustrates process and data flows 400 for performing address-book based authentication between the devices 102. Put differently, FIG. 4 illustrates an authentication protocol that is based on address book entries. The protocol shown in FIG. 4 may be performed by components such as the address book-based authentication components 302A and 302N and devices 102A and 102N, as shown in FIG. 3. However, it is noted that aspects of the process flow 400 and related protocols may be performed with other components without departing from the scope and spirit of the description herein.

For convenience only, FIG. 4 shows the device 102A as initiating a request to couple or pair with the device 102N. Thus, FIG. 4 shows the device 102A as an initiating device, and the device 102N as a target device. However, it is noted that the authentication protocols shown herein may be mutual in nature, in that the device 102A may authenticate the device 102N, and the device 102N may authenticate the device 102A. Additionally, these authentications may proceed sequentially, or simultaneously. Finally, the data flows represented in dashed lines in FIG. 4 may travel via the direct communication link 116 described above.

For convenience only, the blocks as shown in FIG. 4 are arranged in two columns, generally corresponding to the initiating device 102A and the target device 102N. This arrangement is presented only to indicate processing that may be performed by the initiating device 102A and the target device 102N for the purposes of this description, but not to limit possible implementations of this description.

Turning to the process flow in more detail, block 402 represents sending a pairing request to the target device. In the example shown in FIG. 4, the initiating device 102A may send a pairing request 404 to the target device 102N. Block 402 may be performed in response to, for example, the initiating device 102A detecting the target device 102N within a certain proximity.

Block 406 represents receiving the pairing request. In the example shown in FIG. 4, the target device 102N may receive the pairing request 404 from the initiating device 102A.

Block 408 represents sending a challenge to the initiating device in response to receiving the pairing request. In the example shown in FIG. 4, the target device 102N may send a challenge 410 to the initiating device 102A in response to the pairing request. The challenge 410 enables the target device 102N to authenticate the initiating device 102A.

Block 412 represents the initiating device 102A receiving the challenge 410 sent by the target device 102N in block 408. By responding appropriately to the challenge, the initiating device 102A may authenticate itself to the target device 102N.

Block 414 represents the initiating device sending a response 416 to the challenge. For example, the initiating device 102A, may perform block 414 in response to receiving the challenge in block 412.

Recall that the address book-based authentication scheme shown in FIG. 4 exchanges data between the devices 102A and 102N via the direct communication link 116. In the authentication scheme shown in FIG. 4, the initiating device 102A may receive a secret key 416 from the target device 102N via the indirect communication link 118. More specifically, the initiating device 102A may receive the secret key 416 as a result of successfully participating in a key-based authentication process between the initiating device 102A and the target device 102N, carried out over the indirect communication link 118. A non-limiting example of such a key-based authentication process is shown in FIG. 6 and described in connection therewith.

In any event, block 414 may include using the secret key received from the target device 102N to process the challenge, and to formulate a response 418 thereto. If the key-based authentication process between the initiating device 102A and the target device 102N (e.g., as shown in FIG. 6) is not successful, then the initiating device 102A does not receive the secret key, and cannot respond appropriately to the challenge 410 issued by the target device 102N as part of the address book-based authentication protocol shown in FIG. 4.

Block 420 represents receiving the response 118 to the challenge 410. Block 420 may represent the target device 102N receiving the response 418. Having received the response to the challenge at 420, the target device 102N may perform decision block 422, which represents evaluating whether the received response is valid. In some implementations, block 422 may include determining whether a response to the challenge was received at all, or was received within some expected timeframe for response. In other implementations, where some response 418 is received, block 422 may include evaluating the challenge as received, to assess its validity.

In any event, if the target device 102N receives no response to the challenge, or if the target device 102N receives a response that is invalid, the process flow 400 may take No branch 424 to block 426, which represents denying the pairing request 404. In some instances, the target device 102N may communicate the denial of this pairing request to the initiating device 102A. FIG. 4 denotes this denial at 428. In other instances, the target device 102N may deny the pairing request without communicating this denial to the initiating device 102A.

Returning to the decision block 422, if the target device 102N has received a valid or expected response 418 to the challenge 410, then the process flow 400 may take Yes branch 430 to block 432, which represents granting the pairing request 404. In this case, the target device 102N may communicate approval of the pairing request to the initiating device 102A, as denoted at 434.

At the initiating device 102A, block 436 represents receiving a response to the pairing request. As described above, this response may take the form of an approval (e.g., 434) or a denial (e.g., 428). Recall that the denial may be considered optional in nature.

Having described the process flow 400 for performing address book-based authentication in FIG. 4, the discussion now turns to a more detailed description of the address book-based authentication protocol, now presented with FIG. 5.

FIG. 5 illustrates further details of the address book-based authentication process shown in FIG. 4, represented generally as process and data flows 500. The processing blocks as shown in FIG. 5 are arranged similarly to FIG. 4, once again for convenience only in describing a possible process flow between the initiating device 102A and the target device 102N.

Block 502 represents hashing a unique identifier assigned to or associated with the initiating device 102A. Examples of the unique identifier are shown and described above at 112. Generally, the unique identifier may represent any identifier by which communications may be addressed to the initiating device 102A, for example, communications originating from the target device 102N. An example of the unique identifier may be a telephone number assigned to the initiating device 102A.

Block 502 may use any suitable one-way hash function, such that it is very difficult to calculate the unique identifier, given the hashed unique identifier. The unique identifier may be considered private or sensitive information that users may not want exposed openly to unauthorized third parties. a one-way hash function enables execution of the protocol shown in FIGS. 4 and 5 without exchanging the actual identifiers in the clear, and thus may avoid compromising the identifiers.

Block 504 represents sending the hashed identifier, denoted at 506, to the target device 102N. Referring briefly back to FIG. 4, the pairing request 404 may include the hashed identifier 506. As shown in FIG. 5, the initiating device 102A may send the hashed identifier to the target device 102N, with which the initiating device 102A wishes to pair.

At the target device 102N, block 508 represents receiving the hashed identifier 506. Having received the hashed identifier, the target device 102N may determine whether it should grant the pairing request from the initiating device 102A.

Block 508 represents searching an address book or other similar data structure maintained by the target device 102N. The target device may perform block 508 in response to receiving the hashed identifier 506. Examples of the address book are shown in FIGS. 1 and 2 at 114. The target device 102N may compare the incoming hashed identifier to contact details stored in, for example, the address book 114N. To facilitate this comparison, the target device may compute hashes of all contact details stored in its address book, using the same hash function employed by the initiating device 102A. In this manner, the target device 102N can determine whether its address book contains an entry for the initiating device 102A.

Block 510 represents determining whether the search performed in block 508 results in a match between the incoming hashed identifier and any entries in the address book of the target device 102N. If not, then the process flow 500 takes No branch 512 to block 426, which denies the pairing request.

In this scenario, the target device 102N has determined that its address book contains no entry corresponding to the initiating device 102A. This may indicate that a user (e.g., 102N) of the target device 102N has not entered contact information associated with a user (e.g., 102A) of the target device 102A. Therefore, the user 102N may not know or trust the user 102A well enough to exchange telephone numbers, for example. On that basis, the target device 102N may reject or deny the pairing request, as denoted at 428.

Returning to block 510, if the target device 102N finds a match in its address book for the incoming hashed identifier, then the process flow may take Yes branch 514 to block 516. In this scenario, the users 102A and 102N have exchanged unique identifiers, such as telephone numbers, thereby indicating that at least some degree of familiarity or trust may exist between the two users.

Block 516 represents determining whether the target device 102N has authenticated the initiating device 102A under, for example, a key-based authentication scheme performed via the indirect communication link 118. An example of such a key-based authentication scheme is described in FIG. 6. In but one possible example, the initiating device 102A and the target device 102N may exchange secret keys over the indirect communication link 118.

As described further below in connection with FIG. 6, this key exchange may prevent an imposter, who may be impersonating a legitimate user of the initiating device 102A, from pairing with the target device 102N. For example, the imposter may have found an identifier belonging to the initiating device 102A, and may wish to use that identifier to attempt to pair with the target device 102N. If the initiating device 102A and the target device 102N used only the address book-based authentication protocol, this imposter may successfully pair with and compromise the target device 102N.

If the target device 102N has not yet authenticated the initiating device 102A, then the process flow 500 may take No branch 518 to decision block 520. The process flow 500 may include setting a timeout period applicable to authenticating the initiating device 102A over, for example, the indirect communication link 118.

Block 520 evaluates whether the timeout period has expired. If not, then the process flow 500 may take No branch 522, and return to decision block 516. The process flow 500 may loop between blocks 516 and 520, until, for example, the timeout period expires without the target device 102N authenticating the initiating device 102A. In this case, the process flow 500 may take Yes branch 524 from block 520 to block 426, which denies the pairing request.

Returning to block 516, if the target device 102N does authenticate the initiating device 102A before the timeout period expires, then the process flow 500 may take Yes branch 526 to block 432, which represents granting the pairing request. In this case, the target device 102N may communicate approval 434 of the pairing request to the initiating device 102A.

If, for example, both the initiating device 102A and the target device 102N mutually authenticate each other, under both the address book-based authentication protocol and the key-based authentication protocol, then the two devices 102 may be paired with one another.

Returning to the initiating device 102A, after it sends the hashed identifier in block 504, it may await a response from the target device 102N, as represented in block 528. When the initiating device 102A receives a response from the target device 102N, the process flow 500 may move to block 530. If the response is affirmative, the devices 102 may be paired. If no response is received, or if the response is negative, the devices 102 are not paired.

Having described the address book-based authentication protocols with FIGS. 4 and 5, the discussion now proceeds to a description of a key-based authentication protocol, now presented with FIG. 6.

FIG. 6 illustrates process and data flows 600 for performing key-based authentication between the initiating device 102A and the target device 102N. The devices 102A and 102N may include respective key-based authentication components 304A and 304N that perform aspects of the process and data flows 600 shown in FIG. 6. As with FIGS. 4 and 5 above, FIG. 6 arranges the processing blocks in columns corresponding to the devices 102A and 102N, for convenience only. Data flows between the devices 102A and 102N are again shown by dashed lines, and these data flows may travel along the indirect communication link 118.

Block 602 represents sending an authentication request 604. Block 602 may include sending a key-based authentication request from the initiating device 102A to the target device 102N.

Block 606 represents receiving the authentication request 604, for example, by the target device 102N. In response to receiving the authentication request, the target device 102N and the initiating device 102A may agree on a secret key 608. The actions taken by the initiating device 102A and the target device 102N in agreeing on the secret key 608 are represented respectively by blocks 610A and 610N. The devices may, for example, agree on the secret key by generating secret numbers, and exchanging them via the indirect link. In example non-limiting implementations, the devices may use Diffie Hellman Key Agreement protocol (or its Elliptic curve variant) for the key agreement process.

In possible implementations, the initiating device 102A may generate a first secret number, and send it to the target device 102N via the indirect link. Similarly, the target device 102N may generate a second secret number, and sent it to the initiating device 102A via the indirect link. In this event, both devices may combine the secret numbers to form a mutually-known, shared secret key that is used to formulate a challenge, as now described.

Block 612 represents formulating and sending a challenge 614 to the initiating device 102A. This challenge may include a randomly-generated nonce, and the target device 102N may encrypt the challenge with the key 608. As detailed further below, the initiating device 102A may decrypt the challenge and return the nonce to the target device 102N only if the initiating device 102A has received the key 608.

At the initiating device 102A, block 616 represents receiving the nonce-challenge 614 from the target device 102N. With the initiating device 102A and the target device 102N having agreed on the secret key 608, and with the initiating device 102A having received the nonce-challenge 614, block 618 represents decrypting the nonce-challenge 614. Block 618 may include using the secret key 608, as represented by the line 620, to extract the nonce from the challenge.

Block 622 represents returning the nonce as a response to the challenge 614. FIG. 6 denotes the nonce-response at 624.

At the target device 102N, block 626 represents receiving the nonce-response 624. Decision block 628 represents evaluating the validity of the response. More specifically, block 628 may include comparing the nonce as received in block 626 to the nonce that was included in the challenge in block 612. If these nonces match, then the process flow 600 may take Yes branch 630 to block 632, which represents approving the key-based authentication request 604. FIG. 6 denotes this approval generally at 634.

Returning to the decision block 628, if the nonces do not match, or if the target device 102N receives no response 624 at all, then the process flow 600 may take No branch 636 to block 638. Block 638 represents denying the key-based authentication request 604. FIG. 6 denotes this denial generally at 640.

On the initiating device 102A, block 642 represents receiving a response to the authentication request 604. This request may include the approval 634, or the denial 640 (in instances where the target device 102N affirmatively reports the denial).

On the target device 102N, the key-based authentication component 304N may report the status of the key-based authentication request, once determined, to the address book-based authentication component 302N, as indicated by the dashed line passing into decision block 516 in FIG. 5. Additionally, if the protocol shown in FIG. 6 completes successfully to approve the key-based authentication request, then the initiating device 102A may use the secret key 608, as agreed to with the target device 102N, to respond to the challenge 410, as indicated by line 416 in FIG. 4

Given the above description of the key-based authentication protocols and the address-based authentication protocols, several observations are now noted. Assume, for example, that a device belonging to a user Alice wishes to pair her device with a device belonging to a user Bob. Assume that Alice's telephone number is (555) 555-1212, that she has given Bob her number, and that Bob has entered Alice's number into his address book. Thus, Alice may begin the address-based authentication protocols by hashing her telephone number, and sending this hashed value to Bob via the direct communication link 116.

Additionally, the parties may begin the key-based authentication protocol, if they haven't already exchanged keys successfully. However, the key-based authentication protocol occurs over the indirect communication link 118, which may be, for example, a relatively secure service, such as SMS. Thus, Bob may send his secret key via SMS to (555) 555-1212, which purportedly is Alice's telephone number. However, Alice cannot obtain Bob's secret key unless she truly has access to what is sent to (555) 555-1212. Further, without obtaining Bob's secret key, Alice cannot complete the address-based authentication protocol. Thus, the key-based authentication protocol complements the address-based authentication protocol. Considering both protocols as operating in concert as described herein, the combined protocols as a whole are typically at least as secure as the indirect communication link 118.

Assume, for example, that a malicious user Ian intercepts Alice's hashed telephone number, as sent to Bob as part of the address-based authentication protocol. With Alice's hashed telephone number in hand, Ian might be able to impersonate Alice, and trick Bob into thinking that Ian is Alice, because Bob's address book may show Alice's phone number. However, unless Ian has access to the Alice's telephone number, Ian cannot complete the key-based authentication protocol. Thus, despite the fact that Ian has, in some sense, compromised the address-based authentication protocol, Ian is not likely to compromise the key-based authentication protocol, unless Ian can undermine or hack, for example, the SMS system.

Figure 7:
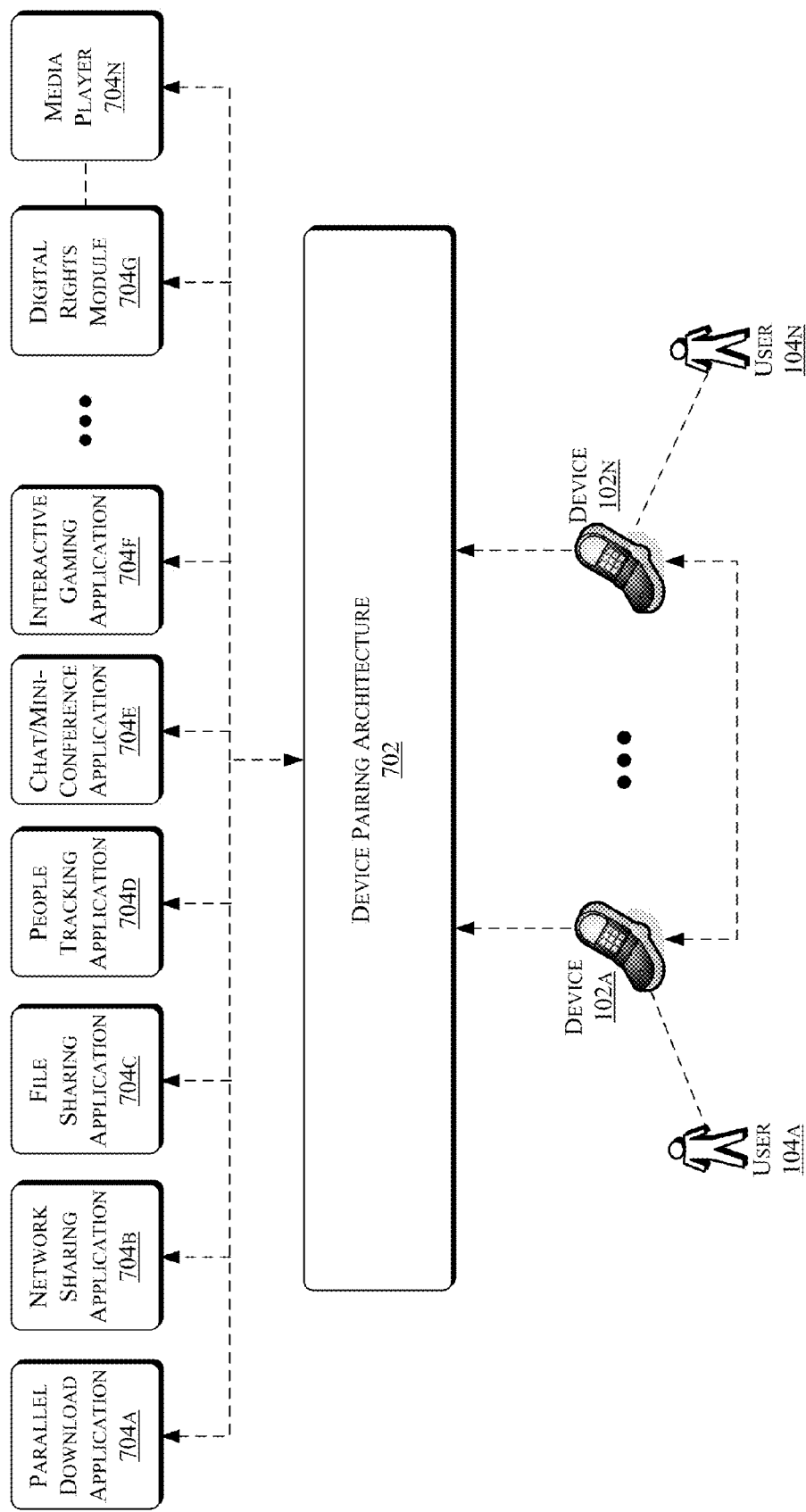
FIG. 7 is a block diagram of an operating environment including a device pairing architecture and one or more related applications.

Having described the above operating environments with FIGS. 1-6, the discussion now turns to a description of applications and related models that the above operating environments may facilitate, now presented beginning with FIG. 7.

FIG. 7 illustrates an operating environment 700 including a device pairing architecture 702 and one or more related applications 704. The device pairing architecture enables two or more paired devices 102 to share data and applications. For convenience only, but not to limit possible implementations of the subject matter described herein, the devices 102 and the users 104 are carried forward from FIGS. 1-6. However, it is noted that the operating environment 700 may include devices other than those denoted herein at 102.

As noted above with FIGS. 1-6, the term "pairing" as used herein does not limit the description herein to connecting two devices 102 to communicate directly with one another. Instead, the term "pairing" is chosen only for convenience, and two or more devices 102 may be connected to communicate directly with one another.

The device pairing architecture 702 may be implemented using the tools and techniques described above in FIGS. 1-6 in connection with providing automated secure pairing for wireless devices. As such, the device pairing architecture may include components that are distributed across the devices 102A and 102N. Examples of such components may include the address book-based authentication components 302 and the key-based authentication components 304. However, it is noted that the device pairing architecture 702 may operate with any scheme suitable for connecting the devices 102 to communicate directly with one another, and is not limited to the tools and techniques described above in FIGS. 1-6.

Once the devices 102 are coupled or paired, the devices may share data and applications with one another. FIG. 7 illustrates several non-limiting examples of such applications 704, which may be loaded and configured on one or more of the devices 102. As described herein, the devices 102 may share data between themselves, and/or share processing using any of the applications 704.

A parallel download application 704A enables a first device (e.g., the device 102A) to share the burden of downloading data over a network with one or more second or other paired devices (e.g., the device 102N). In this manner, if the first device has limited connectivity to the network or suffers from limited bandwidth, and if the other paired devices have more bandwidth, then the other devices may assist the first device by shouldering parts of the download task. This feature is described further herein.

A network sharing application 704B enables a first device (e.g., the device 102A), which has connectivity to a given network, to share that network connection with one or more other paired devices (e.g., the device 102N). In this manner, the device 102N may piggyback onto the network connection of the device 102A.

A file sharing application 704C enables a first device (e.g., the device 102A), which contains one or more files of interest, to share these files of interest with one or more paired devices (e.g., the device 102N).

A people tracking application 704D enables a user associated with a first device (e.g., the device 102A) to track how much time the user has been connected or paired with one or more other devices (e.g., the device 102N). The people tracking application may, for example, indicate with whom the first device paired, how long the devices were paired, and when the pairing relationships began and ended for different instances of pairing.

A chat or conferencing application 704E enables two or more paired devices 102 to establish a private chat session among themselves. For example, if users 104 are engaged in a meeting in which the users are located in reasonable physical proximity to one another, they may use the devices 102 to set up a mini-conference within the context of the meeting. Using this mini-conference capability, these users may privately chat or otherwise communicate with one another.

Other aspects of the conferencing application 704E enable a first device (e.g., the device 102A) to share an incoming or outgoing call with one or more other devices (e.g., the device 102N). For example, assume that the users 104 are attending a family function together. At some point, the user 104A receives a call from a relative who isn't attending the function. If the user's device 102A is paired with one or more other devices 104N, then conferencing application may bridge or conference-in the other users (e.g., 104N), so that the absent family member may converse with both users 104A and 104N.

An interactive gaming application 704F may enable the users 104 to play interactive games with one another. In this manner, two or more users 104 associated with paired devices 102 may play games together, whether in a collaborative mode, or competing against one another.

A digital rights module 704G may cooperate with a media player application 704N to enable a first device (e.g., the device 102A) to share digital media content with one or more paired devices (e.g., the device 102N). For example, the device 102A may store digital content in the form of music, video, software, or the like that may be subject to digital rights management policies. Put differently, the digital content may be licensed from third parties, and subject to copyright or other intellectual property protections. Under suitable restrictions, the device 102A may share such content with one or more other devices 102N, as permitted under policies established and/or enforced by the digital rights module. For example, the device 102A may enable the media player 704N on the paired device 102N to play a song stored on the first device 102A, but only once or only for a predefined interval of time, or the like.

Figure 8:
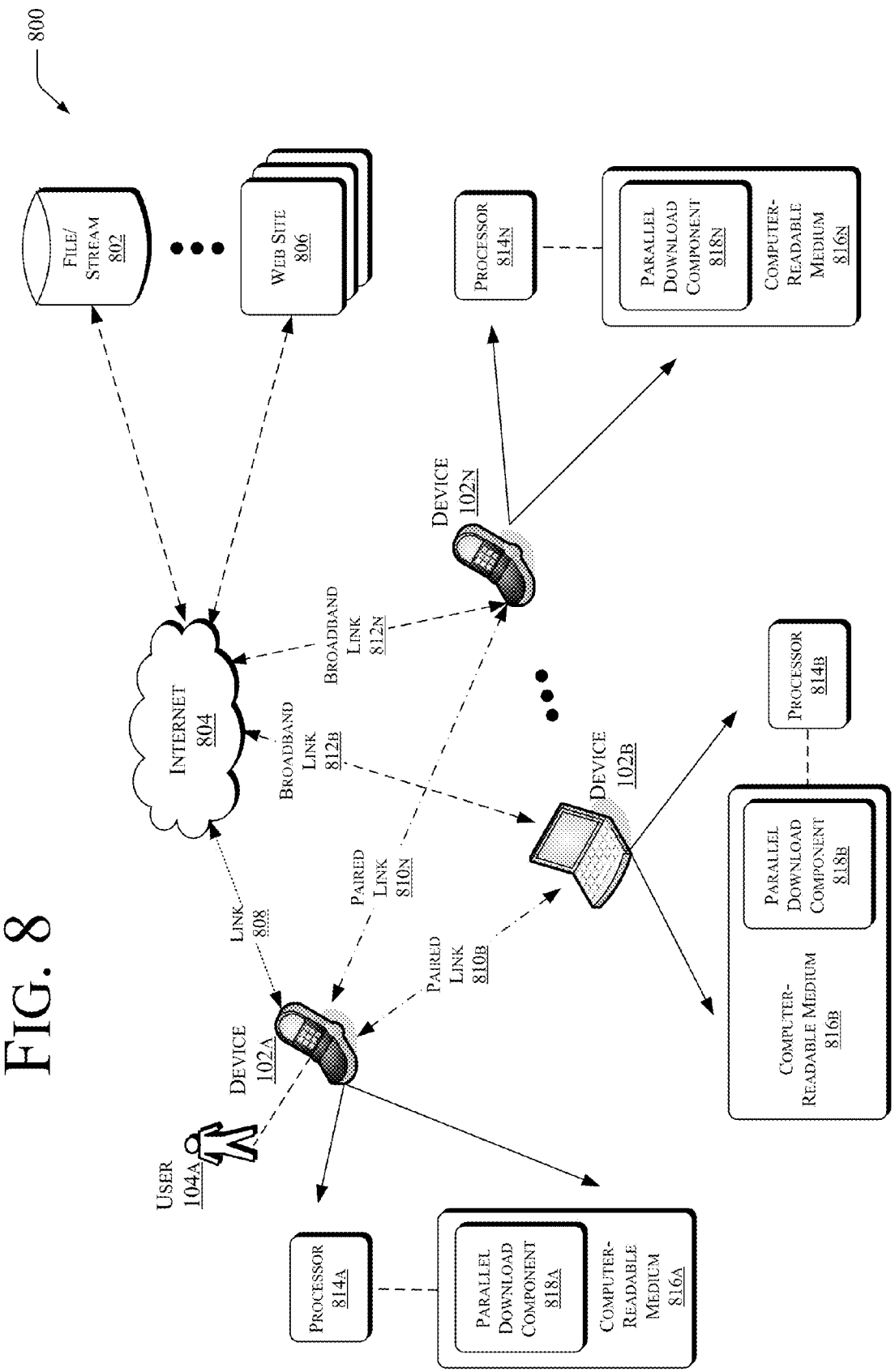
FIG. 8 is a combined block and data flow diagram illustrating an operating environment for performing parallel downloads among a plurality of paired devices.

Having described the operating environment 700 in FIG. 7, the discussion now proceeds to a more detailed description of the parallel download application 704A, now presented with FIG. 8.

FIG. 8 illustrates an operating environment 800 for performing parallel downloads among a plurality of paired devices. For convenience, but not limitation, some components are carried forward from previous drawings, and denoted by identical reference signs. For example, FIG. 8 shows the device 102A paired to communicate directly with at least paired devices 102B and 102N. As shown in FIG. 8, the device 102A is associated with the user 104A.

FIG. 8 illustrates a scenario in which the user wishes to download or access one or more files or streams 802 over a wide area network, such as the Internet 804. The user may also wish to access one or more websites 806 over the Internet. Assume that the device 102A has limited or no connectivity to the Internet, as denoted by the link 808. However, the device 102A may communicate directly with the paired devices 102B and 102N over respective paired links 810B and 810N. The paired links 810B and 810N are assumed to have higher bandwidth than the link 808.

The paired devices 102B and 102N may connect to the Internet via respective broadband links 812B and 812N. For the purposes of describing FIG. 8, assume that the bandwidths of the broadband links 812B and 812N exceed the bandwidth of the link 808. It is noted that, to promote clarity, the various links 808, 810, and 812 shown in FIG. 8 represent any network adapters, drivers, and other hardware and software that enable the various devices to connect to the various networks.

In this scenario, if the device 102A downloads the entire file 802, or accesses the website 806, only through the link 808, then this download or access may take a relatively long time. If the link 808 has no connectivity to the Internet, the download or access may not be possible, at least until the link 808 restores some connectivity to the Internet. However, as described further herein, the device 102A may partition this download or access across the paired devices 102B and 102N. In this manner, the device 102A may enlist the help of the devices 102B and 102N to accomplish the download or access from the Internet, despite the low-bandwidth link 808. More specifically, the device 102A may take advantage of the paired links 810 and the broadband links 812, to overcome the limitations of the low-bandwidth link 808.

The devices 102A, 102B, and 102N may include one or more respective processors 814A, 814B, and 814N (collectively, processors 814). The foregoing description of the processors 106 may apply equally to the processors 814, although the processors 814 may be of different types or models than the processors 106.

The devices 102A, 102B, and 102N may include one or more instances of respective computer-readable storage media 816A, 816B, and 816N (collectively, computer-readable storage media 816). The foregoing description of the computer-readable storage media 108 may apply equally to the media 816, and is not repeated here in the interests of conciseness.

The parallel download application 704A as shown in FIG. 7 may be distributed across respective components included in the devices 102A, 102B, and 102N. As shown in FIG. 8, the devices 102A, 102B, and 102N may include respective parallel download components 818A, 818B, and 818N. These parallel download components may be implemented as one or more software modules stored in the media 816. These modules may be loaded into the processors 814 and, when executed, may cause the respective devices 102A, 102B, and 102N to perform the various functions described herein, to perform parallel downloads among the paired devices.

The parallel download component 818A may enable the device 102A to request that the devices 102B and 102N assist in, for example downloading files or accessing websites over the Internet. More specifically, the parallel download component 818A may communicate with corresponding parallel download components 818B and 818N on the devices 102B and 102N in completing these functions, as detailed further herein. In this manner, the devices 102A, 102B, and 102N may form a mobile community of wireless devices that share network and processing resources with one another.

Figure 9:
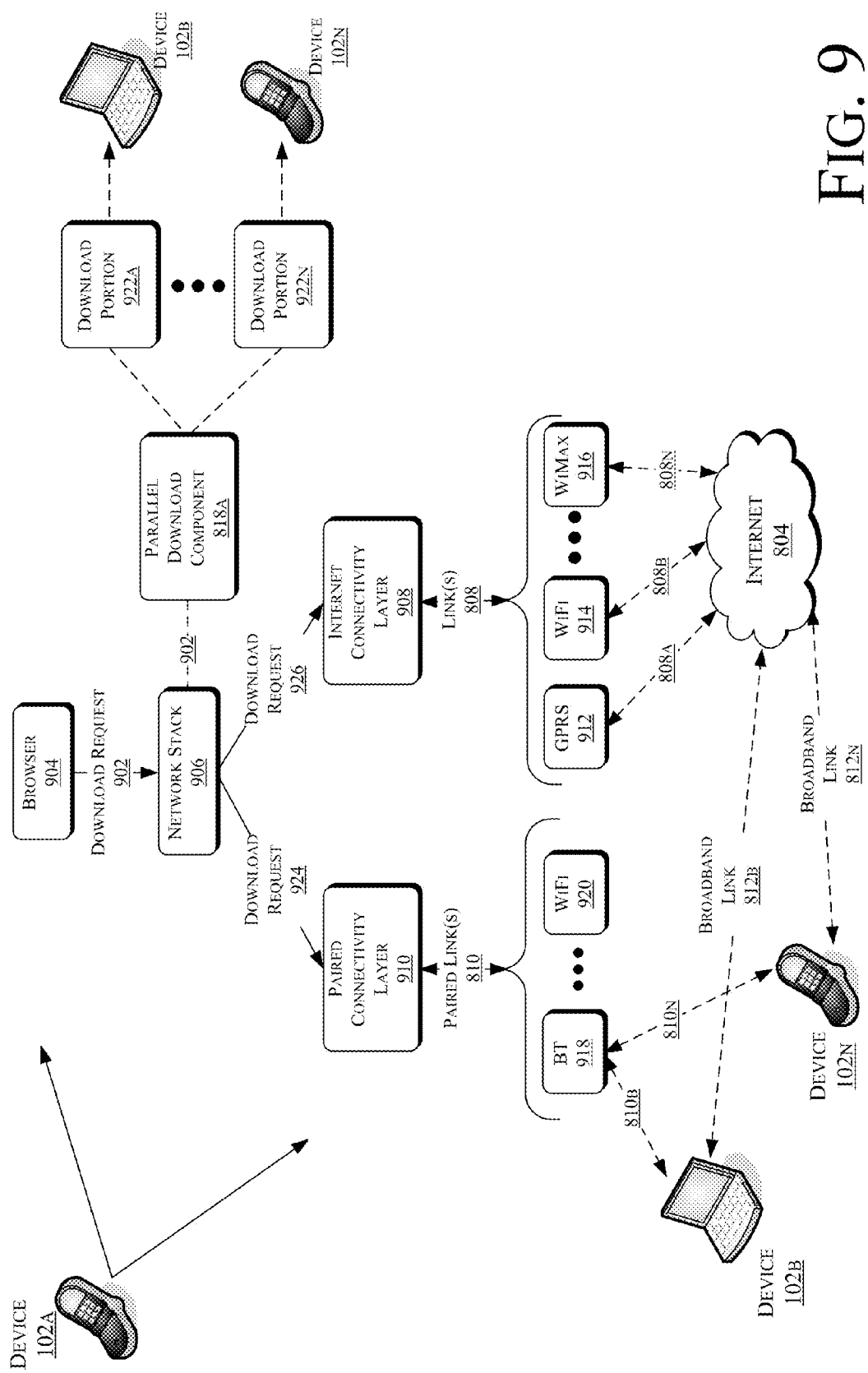
FIG. 9 is a combined block and data flow diagram illustrating components and data flows related to a first device, when performing parallel downloads distributed among one or more other devices that are paired with the first device.

Having described the operating environment 800, the discussion proceeds to a more detailed description of components and data flows related to the device 102A, when performing parallel downloads among the paired devices, now presented with FIG. 9.

FIG. 9 illustrates components and data flows related to the device 102A, when performing parallel downloads distributed among the paired devices 102B and 102N. For convenience only, some features illustrated above are carried forward, and denoted by identical reference numbers.

As shown in FIG. 9, the user 104A may submit, through the device 102A, a request to download or access content over the Internet (e.g., 804 in FIG. 8). FIG. 9 denotes this request generally at 902, and the user may interact with a browser application 904 to submit this request 902. As described above, the content sought by the user may include files, streaming content such as audio and/or video, software, access to websites and related HTML pages, or the like.

The browser may forward the download request 902 to a network stack component 906, which provides an interface to an Internet connectivity layer 908 and to a paired connectivity layer 910. The Internet connectivity layer 908 provides interfaces to any adapters, drivers, or other hardware and/or software components related to the link 808. Recall that the link 808 enables the device 102A to communicate with the Internet 804. For example, the device 102A may access the Internet via a GPRS component 912, a WiFi component 914, a WiMax component 916, or other components that implement any suitable access technologies. As shown in FIG. 9, these components 912-916 may provide respective links 808A, 808B, and 808N to the Internet 804.

Turning to the paired connectivity layer 910, this layer provides interfaces to any adapters, drivers, or other hardware and/or software components related to the paired link or links 810. Recall that the link 810 enables the device 102A to communicate directly with one or more paired devices (e.g., devices 102B and 102N). For example, the device 102A may be paired with one or more other devices via a BlueTooth (BT) component 918, a WiFi component 920, or other components that implement any suitable pairing technologies. It is noted that, for example, WiFi technologies may be suitable for enabling access to the Internet 804 or to the paired devices 102B and 102N.

Returning to the network stack 906, the parallel download component 818A may cooperate with the network stack to partition the download request 902 into a plurality of download portions 922A and 922N (collectively, download portions 922). More specifically, the parallel download component 818A may receive notification of the download request 902, determine bandwidth capacities of one or more paired links and related broadband links (e.g., 810 and 812), determine bandwidth capacities of one or more local Internet links (e.g., 808), partition the download request 902 into the one or more portions 922, and assign one or more of the portions 922 to paired devices (e.g., 102B and 102N). In some instances, where the device 102A has at least some connectivity, it may download one or more of the portions itself.

It is noted that the various download portions 922 need not be equal. Instead, the parallel download component may size the download portions, depending on the capacity of the available links that may perform the downloads. For example, if combination of a given broadband link (e.g., 812B) and a given paired link (e.g. 810B) offers relatively high bandwidth, then the parallel download component may allocate a larger portion of the overall download to this combination of links. Similar logic may apply to links having lower bandwidth.

In any event, the parallel download component 818A may formulate download requests 924 and 926, which correspond respectively to the download portions 922A and 922N. These download requests 924 and 926 may be viewed as a subset of the download request 902. The network stack may route these requests 924 and 926 to, respectively, the paired connectivity layer 910 and the Internet connectivity layer 908.

The devices 102A, 102B, and 102N may be viewed as forming a network or community of mobile wireless devices for parallelizing the download process. As such, the devices 102A may be viewed as an initiator node within this network or community. The initiator node 102A may form the network to include, for example, the paired devices 102B and 102N as additional nodes. After forming the group, the initiator node may initially estimate the speeds of the nodes, and then may vary the workload allocated to these nodes depending on their speeds.

Figure 10:
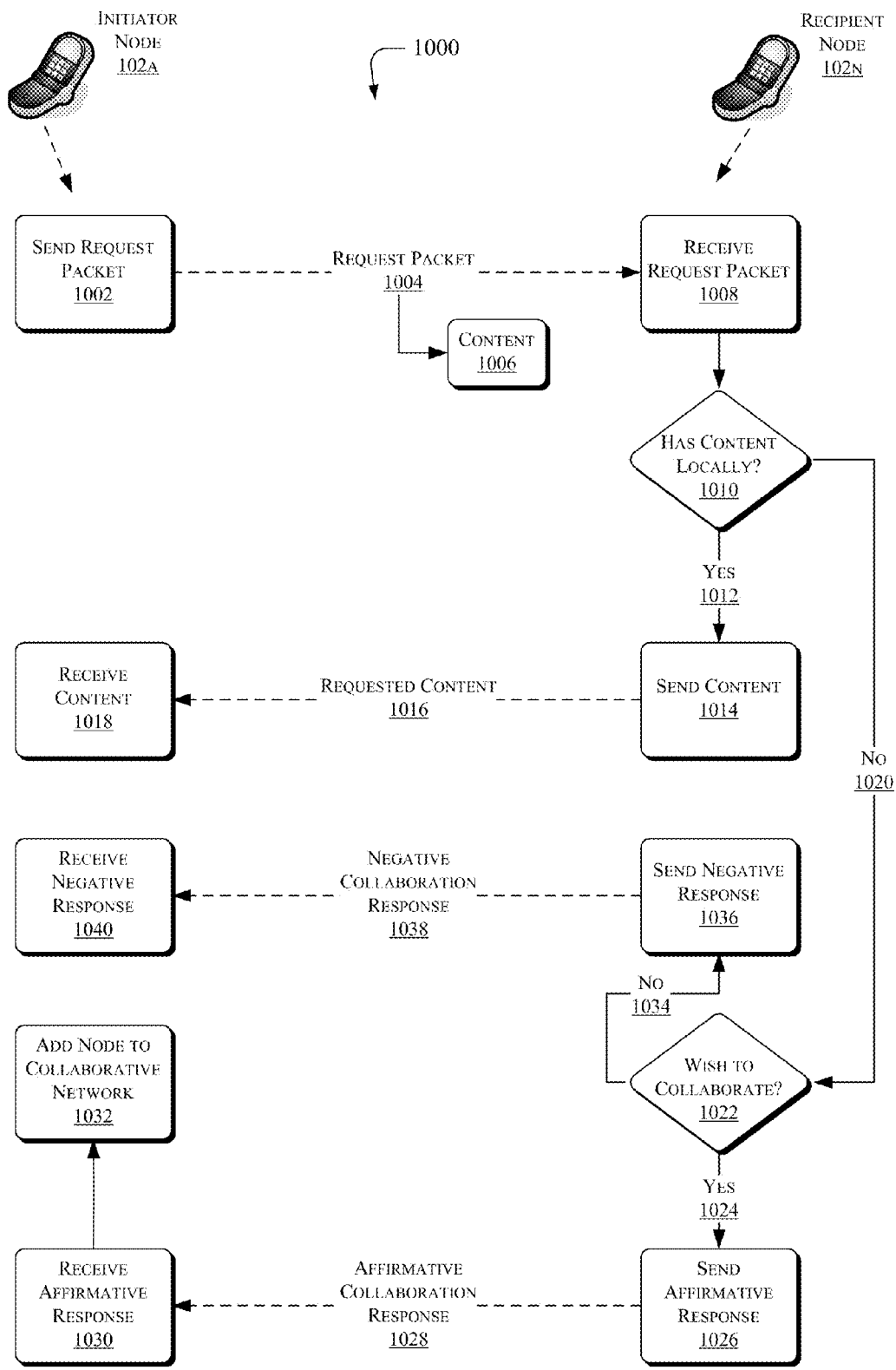
FIG. 10 is a combined process and data flow diagram, illustrating a process for forming a collaborative network of two or more wireless mobile devices for performing parallel downloads among the devices.

Having described the components and data flows in FIG. 9, the discussion now turns to a description of a process flow for forming groups or networks of devices to perform parallel downloads among paired devices, now presented in FIG. 10.

Group Formation Protocols

FIG. 10 illustrates a combined process and data flow 1000 for forming a group or network of two or more mobile wireless devices, or nodes, for performing parallel downloads among the devices. While this process flow 1000 is described with certain components illustrated herein, it is noted that at least some of this process flow 1000 may be performed with other components without departing from the scope and spirit of the description herein. Additionally, the order of the process blocks as presented in FIG. 10 is shown for convenience only, but not limitation.

The process and data flow 1000 as shown in FIG. 10 may provide a mechanism or protocol by which an initiating node (e.g., device or node 102A) may request help from one or more other recipient nodes (e.g., device or node 102N) in performing the initiating node's activities. More specifically, the node 102A may ask the other nodes 102N to collaborate with it, in parallelizing some activity undertaken by the node 102A.

Block 1002 represents sending out a controlled broadcast request packet 1004, asking for collaborators. The initiator node 102A may send out the controlled broadcast request packet 1004. The request packet 1004 may indicate the content 1006 sought by the initiator node 102A. For example, this content 1006 may be a file to be downloaded, a website to be accessed, or an audio or video stream to be received. The packet 1004 may indicate the resource location of the content 1006.

As represented in block 1008, one or more recipient nodes (e.g., 102N) may receive the request packet 1004. Upon receiving the request packet, the recipient node may check to see whether it has an up-to-date copy of the content 1006 indicated in the request packet, as represented in decision block 1010. If it does, then the process flow 1000 may take Yes branch 1012 to block 1014.

Block 1014 represents sending content 1016 to the initiator node, in response to the request packet 1004. In this manner, the initiator node may obtain the content from this recipient node via, for example, a high-speed WLAN link (e.g., 810N), as represented generally at block 1018.

Returning to decision block 1010, if the recipient node does not contain the requested content locally, the process flow 1000 may take No branch 1020 to decision block 1022, which evaluates whether the recipient node wishes to join in the collaborative effort proposed by the initiator node.

From decision block 1022, if the recipient node is interested in joining the collaborative effort, then the process flow may take Yes branch 1024 to block 1026. Block 1026 represents sending or unicasting an affirmative reply 1028 to the initiator node.

At the initiator node, block 1030 represents receiving the affirmative reply from the recipient node. Block 1032 represents adding this recipient node to a network of collaborating mobile devices or nodes.

All nodes that receive the request packet 1004 may re-broadcast this packet up to a maximum number of hop-counts set by the initiator node. The initiator node may collect all affirmative replies, and these affirmative replies indicate those recipient nodes that are willing to collaborate with the initiator node, and are thus willing become members of the collaborative community or network.

Returning to decision block 1022, if the recipient node does not wish to collaborate with the initiator node, the process flow 1000 may take No branch 1034 to block 1036. Block 1036 represents sending a negative response 1038 to the initiator node.

At the initiator node, block 1040 represents receiving the negative response 1038. However, in some instances, if the recipient node does not wish to collaborate with the initiator node, the recipient node may opt to not respond to the request packet 1004. In this case, the initiator node would not receive an affirmative response 1028 from this recipient node, resulting in the recipient node not joining the collaborative network.

The initiator node may invoke the above protocol when it wishes to download content via its WWAN link (e.g., link 808), and determines that it wishes to request the help of other mobile devices in downloading this content. In the description below, this initiator node is denoted by S. If any of the local nodes have the content then S may obtain it from that particular node via its WLAN interface. Otherwise, S tries to form a collaborative group to help in the download.

The group formation protocols may proceed as follows:
1. Initiator node S prepares a collaboration request packet CREQ. CREQ may contain the following:
   a. collaborative flag set
   b. address (resource locator) of the file it needs to download
   c. hop_count field set to max_hop_count—a maximum hop-count for the packet
2. S broadcasts the CREQ packet and sets a timer for max_rep_time units.
3. Any recipient node i that receives the CREQ packet may perform the following:
   a. Node i checks its local cache for the file mentioned in the CREQ. If i has the file in its cache, and if it is up-to-date, then it unicasts a reply back to S informing it of the availability of the file. S can now get the file over the WLAN link from i.
   b. If i does not have the file, it does the following
      i. If it is interested in joining the collaborative effort, it unicasts a reply CREP back to S informing it of its willingness to join the group.
      ii. Decrements the hop_count value by 1 and if the hop count is greater then zero, re-broadcasts the packet.
4. If S has a reply from any node informing it of the presence of the file in its local cache, S gets the file from that node over the WLAN link.
5. S collects all the CREPs it receives within the max_rep_time time period. All the nodes that replied in this time period are now counted by S as nodes which are willing to take part in the collaborative effort.

Sub-process 1c helps to ensure that the collaboration request is flooded restrictively. In sub-process 3a, the node i uses the standard if-modified-since HTTP request mechanism to ascertain whether the file in its local cache is consistent with the version on, for example, a server hosting an external website. In sub-process 4, if more than one node has the file in its local cache, then S may obtain the file from the node whose reply came in first. At the end of the group formation mechanism, the node S has a list of the n nodes that are willing to collaborate. These are the nodes from which it got CREPs.

Figure 11:
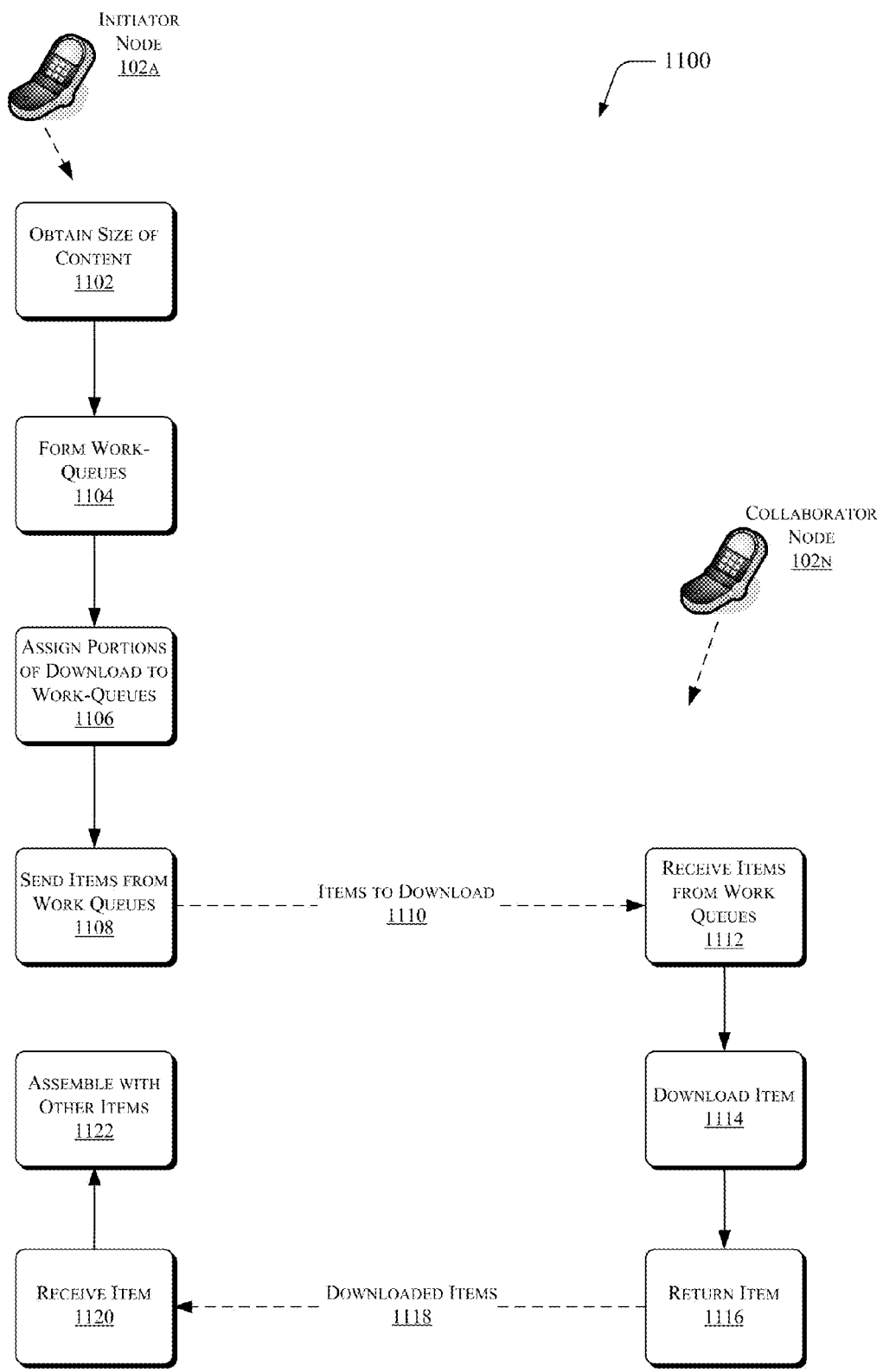
FIG. 11 is a combined process and data flow diagram, illustrating a process for dividing and distributing work among members of the collaborative network.

Having described the above protocols for forming the collaborative network, the discussion now turns to a description of approaches for allocating or dividing the workload among the members of the collaborative network, now presented with FIG. 11.

Work Division and Distribution Algorithms

FIG. 11 illustrates a combined process and data flow 1100 for dividing and distributing work among members of a collaborative network. The collaborative network may be formed, for example, using the protocols shown above in FIG. 10. However, other approaches for forming the collaborative network may be suitable, as well, without departing from the scope and spirit of the description herein.

Having formed a collaborative network including an initiator node S and one or more (n) collaborator nodes, the initiator node S would have a list of the n collaborator nodes. The initiator node S (denoted at 102A in FIG. 11) wishes to divide or distribute the work of downloading the content among the n collaborator nodes (denoted at 102N in FIG. 11) in proportion to the capabilities of the collaborator nodes (e.g., their network speeds, processing power, and the like). To enhance overall performance, the initiator node would like the more powerful collaborator nodes to do a larger portion of the work. As detailed further below, the network speed of the collaborator nodes may be dynamically estimated, and the work distribution allocated in proportion to these estimated speeds.

Possible implementations of the work distribution algorithms may be based on the model of the work-queue. As shown in FIG. 11, block 1102 represents the initiator node obtaining the total size of the content that it wishes to download. The initiator node may perform block 1102.

Block 1104 represents forming a work-queue having a plurality of items. Block 1106 represents assigning, to these items, equal-sized byte ranges of the content to be downloaded.

Block 1108 represents sending items 1110 from the work-queue to the members of the community. The members of the community receive the sent items 1110 at block 1112. At the collaborator nodes, block 1114 represents downloading the content corresponding to the item from, for example, a server associated with a website. Block 1116 represents returning the downloaded items 1118 to the initiator node.

At the initiator node, block 1120 represents receiving the downloaded items 1118. Block 1122 represents assembling the downloaded items 1118 with one or more other downloaded items to constitute the overall downloaded content.

In some instances, servicing of the items in the work-queue may entail opening and closing a connection with the server. Aggregated over a plurality of collaborator nodes, opening and closing these connections may involve significant overhead, and may slow down the download process. Thus, other algorithms may allocate or allot larger portions of the content to the collaborator nodes, based on past performance of the collaborator nodes.

These algorithms may include at least two phases: a learning phase, and a work distribution phase. In most instances, the network speeds of the collaborator nodes are not known before beginning the download process. Thus, the learning phase may treat all of the collaborator nodes as equals, and estimate the speeds of the different collaborator nodes. Afterwards, in the work distribution phase, the collaborator nodes are assigned to download portions of the content in proportion to their estimated speeds.

This description provides at least two algorithms dividing the work load based on the network dynamics. A one-time assignment algorithm assigns the work load for each collaborator nodes based on the initial estimate of the speeds obtained from the learning phase, as described above. This one-time assignment algorithm assigns work only once, and so may be useful in scenarios where the connection speeds of the collaborator nodes do not vary significantly during the overall download process. Under this one-time assignment algorithm, the work assignment may entail relatively little processing for the initiator node, and may be suitable for network environments in which the speeds and performance of the collaborator nodes are relatively static over time.

A periodic assignment algorithm may be suited for a more dynamic network environment, in which the network speeds of the collaborator nodes may change more frequently over time. More specifically, the periodic assignment algorithm may be agile enough to react to any changes in the bandwidths of the collaborator nodes. In response to these changes, the periodic assignment algorithm may dynamically rebalance the loads on these collaborator nodes.

Note that the dynamism of the network can be due to at least three factors. First, the speeds of the individual nodes may vary. Second, because the nodes are mobile, some of the nodes may go out of range, thereby affecting bandwidth and throughput. Third, the nodes may shut down or run out of power.

The variables suitable for describing the algorithms are defined next, followed by the algorithms for the learning and the work distribution phases.

Variable Definitions

1. Number of Collaborator Nodes: n

The number of CREPs received by the initiator node S. The initiator node S itself may be included in this list.

2. Total Size of the File: fs

This variable represents the total amount of work to be done in downloading the content or file. The initiator node S may use this value to determine the amount of work to be assigned to the collaborator nodes. The initiator node S may query the appropriate server hosting the content or file to obtain metadata of the content or file. This metadata would indicate the total size of the content or file.

3. Initial Chunk Size: cs

The amount of data to be downloaded is in proportion to the capacity (network speed) of the nodes, which are calculated dynamically. Initially, since the initiator node does not know the network speeds for the collaborator nodes, the initiator node may assign a standard chunk size for all the collaborator nodes. This standard chunk size may be used until time ts.

4. Weighted Average Speed Array: LS={s1, s2 . . . sn}

This array contains the values of the measured speeds of all the nodes in the group. Initially, this array may be empty, and afterwards filled in and updated dynamically. Hence, this array provides a reasonably reliable estimate of the connection speeds of the nodes.

5. Time after which the Network Speeds of the Nodes are Available: ts

To start with, the algorithm may assign all the nodes equal amounts of work to be done (see 3). After the nodes return their assigned parts at least once, the algorithm would have more definite values of the connection speeds of the nodes. This is assumed to take ts time units.

6. Safe-Chunk Size: p

Assuming that the overall environment in which the algorithms operate is highly mobile and varying, reliability may be a challenge. If the algorithms assign a large portion of the content or file to be downloaded by a single node, afterwards waits for this large portion to download to completion, the algorithms may run the risk of losing out on valuable data if that node moves off in the middle of its download. To avoid this risk, the algorithms may distribute chunks of size p among the nodes. In this manner, the algorithms may avoid concentrating too much work on one node, and exposing the overall process excessively to a single point of failure. In this approach, the amount of data assigned to the nodes is less then equal top.

Learning Phase

Figure 12:
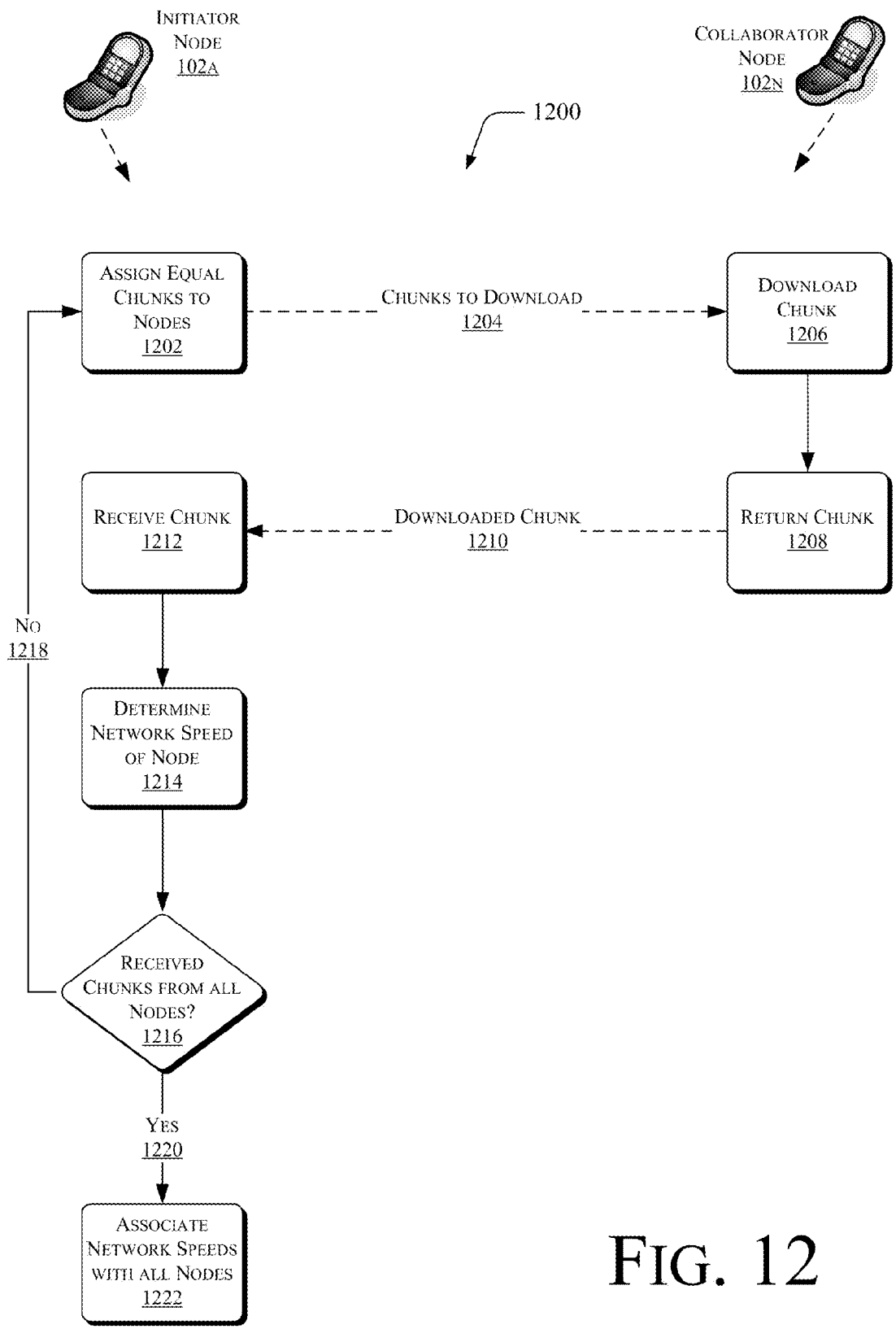
FIG. 12 is a combined process and data flow diagram, illustrating a process for a learning phase algorithm performed in connection with the parallel downloads.

FIG. 12 illustrates a combined process and data flow 1200 for the learning phase algorithm described above. The initiator node may perform the learning phase initially when starting a download process. The learning phase may last for ts time units. The initiator node may use the learning phase initially to estimate the speeds of the nodes within the collaborative group. In this learning phase, the algorithm assigned the nodes an equal amount of data to be downloaded (of chunk size cs). The chunk size is invariant in this learning phase. Faster nodes may download multiple chunks in this phase. Since the overhead associated with every connection establishment process may be significant (e.g. HTTP over TCP), it may be desirable to choose an optimal value for cs. If Cs is set too low, then the algorithm might obtain misleading and incorrect values about the connection speed of the nodes.

The initiator node may perform the following in this phase, as now described. Block 1202 represents assigning a chunk 1204 of size cs for the n collaborator nodes to download. Block 1206 represents the collaborator nodes downloading the assigned chunks.

Block 1208 represents the collaborator nodes returning their assigned chunks, as denoted at 1210. At the initiator node, block 1212 represents receiving the chunks from the collaborator nodes. Block 1214 represents determining the network speed of the collaborator nodes, based on the time it took the nodes to download and return the chunks.

After receiving a chunk from a given collaborator node, the initiator node may determine whether it has received at least one chunk from all of the collaborator nodes, as represented in decision block 1216. If the initiator node has not received a chunk from at least one node, then the process flow 1200 may take No branch 1218, returning to block 1202 to assign the node to retrieve another chunk. This keeps faster nodes busy, while the initiator node waits for one or more slower nodes to return their chunks.

Returning to block 1216, if the initiator node has received chunks from all of the collaborator nodes, then the process flow 1200 may take Yes branch 1220 to block 1222. At this point, the initiator node has received chunks from all collaborator nodes, which takes ts time units. At this point, the initiator node has definite values of the speeds for all the elements in the array LS, and has computed network speeds for all the collaborator nodes, as represented generally at block 1222.

The fact that faster nodes can download multiple chunks ensures that the other nodes are not idling away, waiting for the slowest node to complete its job. ts is the time taken for the slowest node to download and pass the chuck of size Cs to the initiator node.

Work Distribution Phase

In the work distribution phase, the initiator node has an initial idea of the connection speeds of the collaborator nodes, and can then assign the amount of data they have to download in proportion to their speeds. As noted above, this description provides two algorithms for this phase, based on the dynamism of the environment: the one-time assignment algorithm shown in FIG. 13, and the periodic assignment algorithm shown in FIG. 14.

One-Time Assignment

Figure 13:
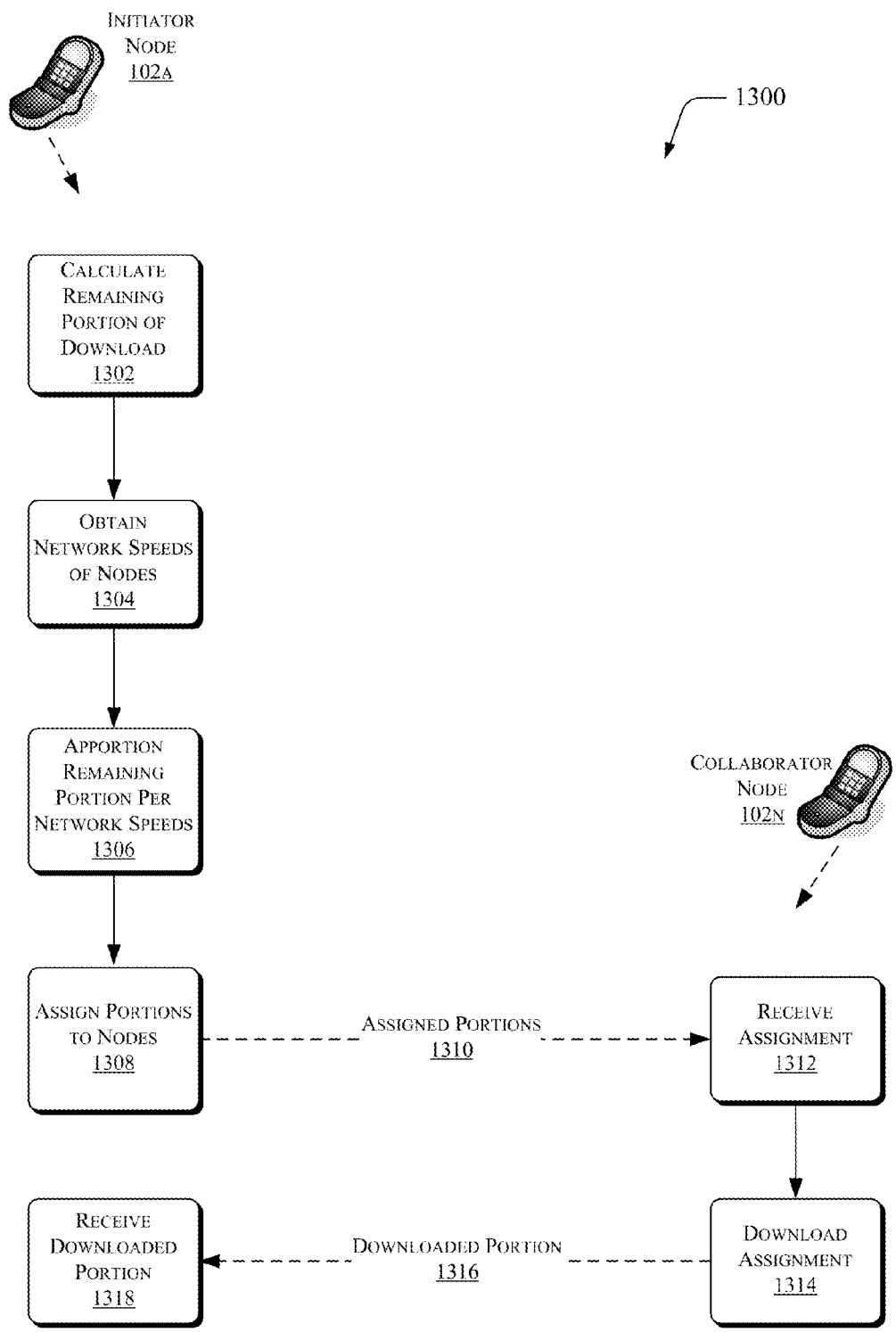
FIG. 13 is a combined process and data flow diagram, illustrating a process for a one-time assignment algorithm performed in connection with the parallel downloads.

FIG. 13 illustrates a combined process and data flow 1300 for the one-time assignment algorithm that may be performed as part of the learning phase described above. The one-time assignment algorithm may be suitable for network environments that are relatively static, or not dynamic.

After the learning phase described in FIG. 12, the initiator node has an initial estimate of the speeds of the collaborator nodes. As represented in block 1302, the initiator node may calculate the portion of the content or file remaining to be downloaded after running the learning phase.

As shown in block 1304, the initiator node obtains the network speeds of the various collaborator nodes, as estimated during the learning phase. Block 1306 represents dividing or apportioning the remaining part of the content or file among the collaborator nodes, in proportion to their respective speeds from the learning phase. Block 1308 represents assigning the respective portions 1310 of the download to the various collaborator nodes.

At the collaborator nodes, block 1312 represents receiving the assignments 1310 from the initiator node. Block 1314 represents downloading the assigned portions of the download, and sending the downloaded portions 1316 to the initiator node. At the initiator node, block 1318 represents receiving the downloaded portions 1316 from the recipient nodes.

Figure 14:
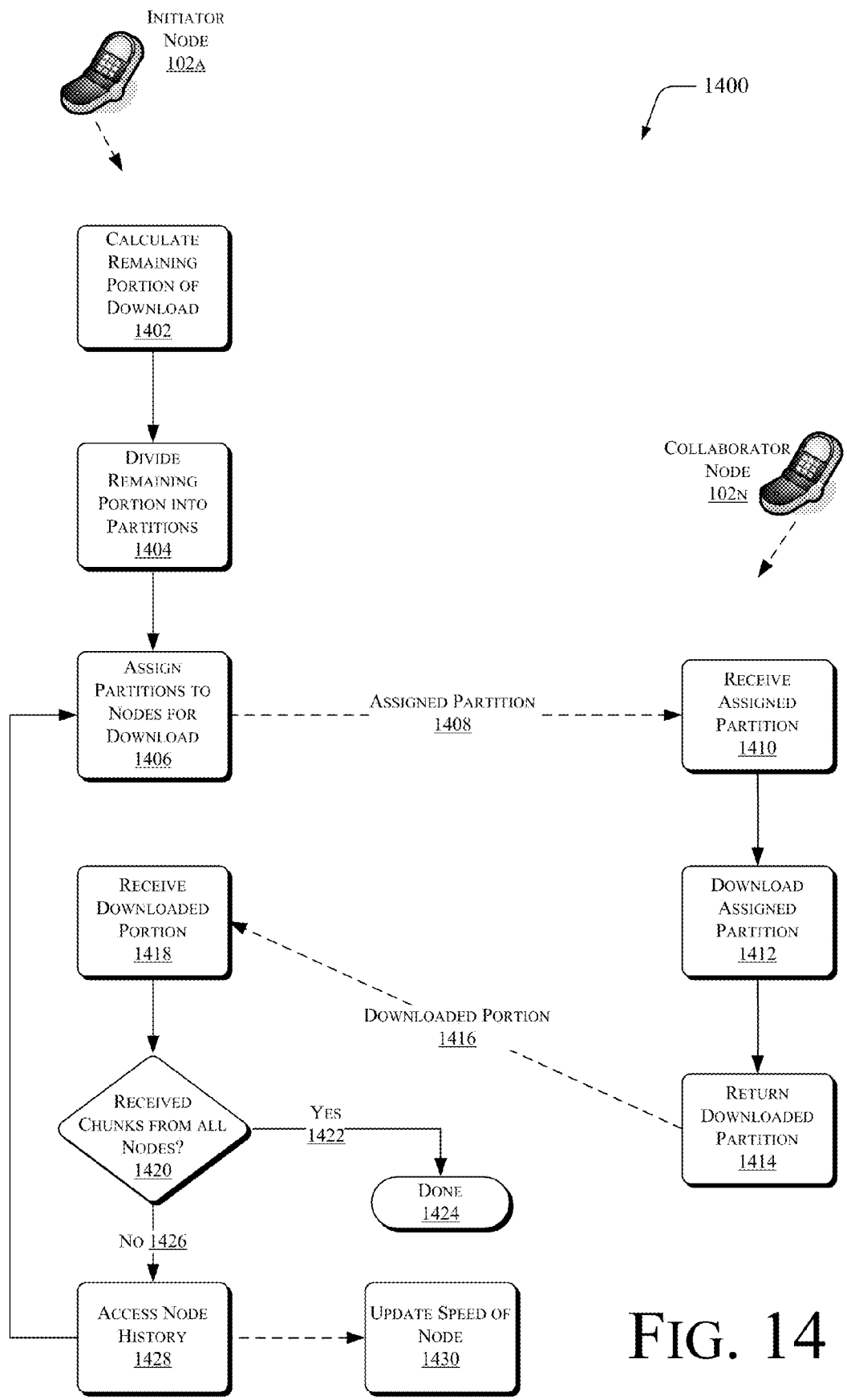
FIG. 14 is a combined process and data flow diagram, illustrating a process for a periodic assignment algorithm that may be performed as part of the parallel downloads.

Having described the one-time assignment algorithm in FIG. 13, the discussion now turns to a description of the periodic assignment algorithm, now presented in FIG. 14.

Periodic Assignment Algorithm

FIG. 14 illustrates a combined process and data flow 1400 for the periodic assignment algorithm described herein. The periodic assignment algorithm is highly agile, and may appropriate for dynamic network environments. At this stage, having performed the learning phase, the initiator node has definite measured values for the elements in the array LS, and also has downloaded a certain amount of the content or file while performing the learning phase.

In the periodic assignment algorithm, the initiator node S assigns work to the periodic assignment algorithm based on the following two criteria:
  a. The amount of work done by a node is in proportion to its network speed as indicated in LS, and
  b. The amount of work assigned to a node is not very high in a single round—this may help to ensure that the amount of salvaging work is minimal in the event of any of the nodes going down at any stage.

Block 1402 represents calculating the portion of the content or file remaining to be downloaded, after completion of the learning phase. Block 1404 represents dividing this remaining portion into fixed-size partitions of size p each. The initiator node S treats every partition individually, and block 1406 represents assigning single partitions 1408 to corresponding nodes to download.

The collaborator nodes handle and download the assigned partitions 1408 sequentially, as represented at block 1410. Block 1412 represents downloading the assigned partitions, and block 1414 represents returning the downloaded partitions 1416 to the initiator node.

At the initiator node, block 1418 represents receiving a downloaded partition from a given collaborator node. After the given collaborator node completes downloading a given partition, the process flow 1400 proceeds to decision block 1420, to determine whether any more partitions remain to be downloaded.

From decision block 1420, if no partitions remain to be downloaded, then the process flow 1400 takes Yes branch 1422 to completion state 1424. Otherwise, if one or more partitions remain to be downloaded, the process flow 1400 takes No branch 1426 to block 1428, which represents accessing a performance history of a given node, as indicated by entries in the array LS, to determine the amount of data that should be assigned to the node to download next. Afterwards, the process flow 1400 may return to block 1406 to assign the next partition of data to be downloaded by the node.

If there are r bytes of the file remaining to be downloaded, S partitions it into c chunks of size p each. So, c*p=r. Now, for any node i, the periodic assignment algorithm can calculate the data it may download as follows:

1. The amount of data to that the node may download is given by:

$$di = \left(\frac{si}{\sum_{j=1}^{n} sj}\right) \times p,$$

where $s_j \in LS$, and $s_i$ is the speed of the $i^{th}$ node and

2. $d_i$ is added to the appropriate offset of the current partition (the partitions are handled sequentially) to get the starting and ending byte count of the data to be downloaded.

The maximum amount of data theoretically possible to assign to a node for downloading in a single round is p. This ensures that there is not too much work assigned to a single node (see b above).

Updating the Speeds in LS

After every iteration of the periodic assignment algorithm for a given node, when the node returns the data it has downloaded, the corresponding s value for that node in LS is updated to store the weighted average speed value of that node. If the present value of s is sp, and the latest speed is sc, then the new value of s is given by:

$$w*sc+(1-w)*sp (0<w<1)$$

The value of w can be varied depending on whether the algorithm is to apply more weight to the latest data acquired for the node, or to the overall history of the node. If the network is highly mobile, a high value for w is desirable. For relatively stable networks, the low value of w may be appropriate. In any event, block 1430 in FIG. 14 represents updating the speed of the various nodes in the collaborative network.

Figure 15:
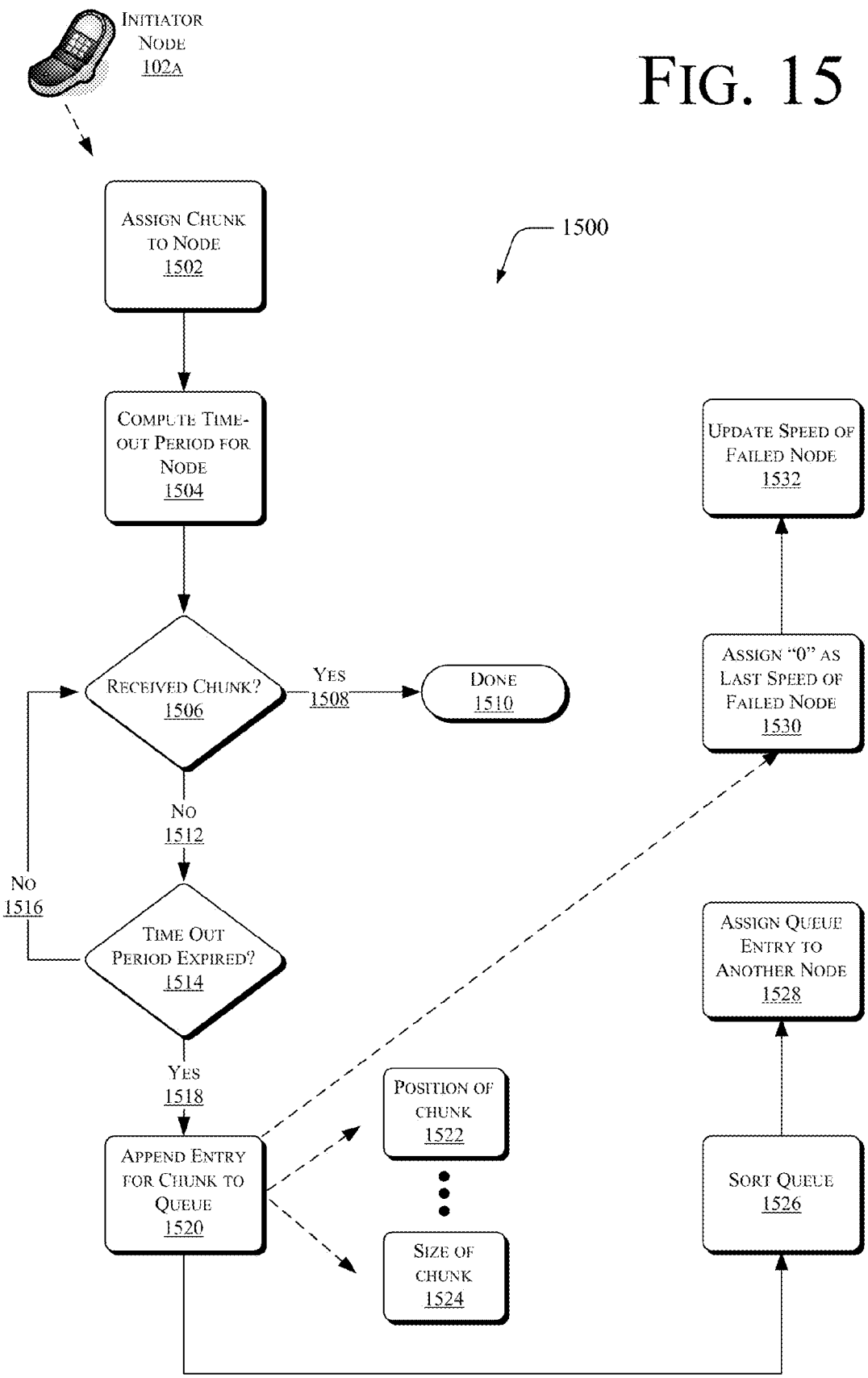
FIG. 15 is a combined process and data flow diagram, illustrating a process for a failure handling mechanism.

Having described the periodic assignment algorithm in FIG. 14, the discussion now turns to a description of failure handling mechanisms, now presented in FIG. 15.

Failure Handling

FIG. 15 illustrates a combined process and data flow 1500 for a failure handling mechanism. Assuming that these algorithms may operate in a highly dynamic network environment, the failure mechanism may handle scenarios in which nodes do not complete their assigned jobs. A node is considered to have failed to complete the job assigned to it if it does not return its downloaded data within an estimated time.

Block 1502 represents assigning a chunk of the download to a given node. After every node is assigned its job, the initiator node calculates a time-out period for the node, as represented in block 1504. The initiator node may calculate this value based on the node's speed, as indicated by LS. If the initiator node expects the node to take time T to complete its job, based on its speed value in LS, then the initiator node may set the time-out period as, for example, 2T.

Block 1506 represents evaluating whether a given node has returned its downloaded chunk. If a downloaded chunk arrives from the given node, then the process flow 1500 may take Yes branch 1508 to a completion state 1510. However, no chunk has yet arrived from the given node, then the process flow 1500 may take No branch 1512 to decision block 1514.

Decision block 1514 evaluates whether the timeout period set in block 1504 has expired. If the timeout period has not expired, then the process flow 1500 may take No branch 1516 to return to decision block 1506. If the timeout period has expired, then the process flow 1500 may take yes branch 1518 to return to block 1520.

If the node fails to complete its job in this time-period, then the failure handling mechanism may append information about that chunk to a failed download queue, as represented in block 1520. As shown in FIG. 15, elements or entries in the failed download queue may contain information indicating the position of the chunk within the content or file to be downloaded, as represented in block 1522. Elements of the failed download queue may also contain information indicating the size of the chunk, as represented in block 1524.

Block 1526 represents sorting the failed download queue. Block 1526 may include sorting the failed download queue in, for example, ascending order, according to the position of the chunk within the file, as indicated in block 1522.

Block 1528 represents assigning entries from the failed download queue to other nodes for downloading. Entries in the failed download queue may be given highest priority, such that servicing this queue is prioritized over other downloading chunks. After the nodes return their assigned chunks of the download, if this failed download queue is not empty, then block 1528 de-queues an element from the queue, and assigns that element to that node for download.

If a given node fails to return a chunk that it was assigned to download, then the failure handling mechanism may assign a zero value as the latest reported speed of this failed node, as represented in block 1530. As represented in block 1532, the s value of that failed node is re-calculated with this latest-reported speed value. In this manner, the failure handling mechanism may accommodate scenarios where a given node goes down temporarily. The temporary failure of the nodes may be due to scenarios in which the nodes become overloaded with their individual work In such cases, the collaborative download tasks may be relegated to the background, or paused temporarily or indefinitely. Since these nodes are voluntarily donating their bandwidth, these scenarios may occur relatively often.

The group formation algorithm may also be run periodically to ensure that the initiator node is dealing only with currently active nodes. Additionally, new iterations of the group formation algorithm may help to clean up stale groups, and purge them of failed or unresponsive nodes.

Having provided the above description of tools for forming the groups and for distributing the work among the members of these groups, it is noted that, in some implementations, the tools may form these collaborative groups without the involvement of any content servers and/or proxy servers from which the content is downloaded. Instead, the initiator nodes and the recipient nodes may themselves perform all of the functions related to forming the groups or distributing the work among the members. More specifically, the initiator nodes and the recipient nodes may perform these functions without the assistance of, for example, any content servers or any proxy servers.

CONCLUSION

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein.

The invention claimed is:

1. A tangible computer-readable storage medium comprising machine-readable instructions that, when executed by the machine, cause the machine to perform a method for pairing at least two devices via a direct connection, the method comprising:
performing a first authentication protocol via the direct connection between the at least two devices based in part on address book entries maintained by at least one of the devices, the first authentication protocol comprising:
receiving, at a target device of the at least two devices, a pairing request including a hashed identifier;
comparing, by the target device, the hashed identifier of the pairing request to previously stored hashed address book entries of the target device; and
determining whether to accept the pairing request when the hashed identifier coincides with at least one of the previously stored hashed address book entries;
performing a second authentication protocol via an indirect connection between the at least two devices that is based on an exchange of security keys between the at least two devices, the second authentication protocol comprising:
receiving, generating or determining at a target device, a security key based on data received from an initiating device;
generating, by the target device, a randomly generated nonce after the receiving, generating or determining the security key;
encrypting the randomly generated nonce using the security key;
sending a challenge to the initiating device, the challenge including the encrypted randomly generated nonce;
receiving a challenge response from the initiating device including the randomly generated nonce that is decrypted; and
comparing the randomly generated nonce that is decrypted and received in the challenge response to the randomly generated nonce that is generated to further determine whether to accept the pairing request.

2. The tangible computer-readable storage medium of claim 1, wherein the instructions for performing the first authentication protocol include instructions for performing the first authentication protocol over a direct Bluetooth or WiFi communication link established between the devices.

3. The tangible computer-readable storage medium of claim 1, wherein the instructions for performing the second authentication protocol include instructions for performing the second authentication protocol over an indirect communication link between the devices, wherein the indirect communication uses a third-party communication service.

4. The tangible computer-readable storage medium of claim 1, wherein the instructions for performing the second authentication protocol include instructions for performing the second authentication protocol over an SMS link established between the devices.

5. The tangible computer-readable storage medium of claim 1, wherein the challenge is sent in response to the receiving the pairing request.

6. The tangible computer-readable storage medium of claim 1, wherein the receiving the pairing request receives the pairing request directly from the initiating device, and further wherein the security key is a combination of a first key portion received indirectly from the initiating device and a second key portion generated at the target device.

7. The tangible computer-readable storage medium of claim 1, wherein the security key is exchanged between the target device and the initiating device in an initial pairing occurrence between the initiating device and the target device.

8. The tangible computer-readable storage medium of claim 1, wherein the hashed identifier is associated with the initiating device.

9. One or more computer readable storage media comprising computer executable instructions that, when executed, direct a computing device to perform the method as recited in claim 1.

10. The tangible computer-readable storage medium of claim 1, wherein the first authentication protocol further comprises denying the paring request when the comparing the hashed identifier with any hashed address book entries fails to match the hashed identifier to a hashed address book entries.

11. A tangible computer-readable storage medium comprising machine-readable instructions that, when executed by the machine, cause the machine to perform a method for pairing at least two devices, the method comprising:
confirming that at least one of a target device or an initiating device successfully complete a first authentication protocol and a second authentication protocol prior to receiving an associated pairing request;
receiving, at the target device, the pairing request from the initiating device over a direct communication link between the initiating device and the target device, the pairing request including a hashed identifier;
verifying, by the target device, that the hashed identifier coincides with at least one previously stored hashed address book entry of the target device;
receiving, determining or generating an authentication key at the target device; and
sending a challenge response to the initiating device, the challenge response including a first nonce in an encrypted form and a second nonce in a decrypted form, the first nonce generated by the target device after the receiving, determining or generating the authentication key and encrypted by the target device via the authentication key and the second nonce generated by the initiating device after the receiving, determining or generating the authentication key and decrypted by the target device via the authentication key.

12. The tangible computer-readable storage medium of claim 11, wherein the instructions for sending at least one pairing request include instructions for sending the pairing request via a Bluetooth communication link.

13. The tangible computer-readable storage medium of claim 11, wherein the instructions for sending at least one authentication request include instructions for sending the authentication request via a Short Message Service (SMS) link.

14. A tangible computer-readable storage medium comprising machine-readable instructions that, when executed by the machine, cause the machine to perform a method for pairing at least two devices, the method comprising:
   requiring, before accepting at least one pairing request, that at least one of the at least two devices successfully complete:
      a first authentication protocol via a direct connection between the at least two devices; and
      a second authentication protocol via an indirect connection between the at least two devices;
   receiving at least one pairing request from an initiating device, the pairing request including a hashed identifier;
   verifying that the hashed identifier coincides with at least one previously stored hashed address book entry by:
      searching an address book of at least one of the at least two devices that receives the at least one pairing request from an initiating device; and
      determining that the hashed identifier matches the at least one previously stored hashed address book entry in the address book;
   encrypting a randomly generated nonce using a security key that is received from the initiating device during a prior pairing occurrence with the initiating device;
   transmitting the encrypted randomly generated nonce to the initiating device; and
   receiving the randomly generated nonce from the initiating device to determine whether to accept the at least one pairing request, the randomly generated nonce that is received from the initiating device being a decrypted form of the encrypted randomly generated nonce transmitted to the initiating device.

15. The tangible computer-readable storage medium of claim 14, wherein the instructions for receiving at least one pairing request include instructions for receiving the pairing request via a Bluetooth communication link.

16. The tangible computer-readable storage medium of claim 14, wherein the instructions for receiving at least one authentication request include instructions for receiving the authentication request via a Short Message Service (SMS) link.

* * * * *

UNITED STATES PATENT AND TRADEMARK OFFICE
CERTIFICATE OF CORRECTION

| | | |
|---|---|---|
| PATENT NO. | : 8,103,247 B2 | Page 1 of 1 |
| APPLICATION NO. | : 11/555093 | |
| DATED | : January 24, 2012 | |
| INVENTOR(S) | : Ganesh Ananthanarayanan et al. | |

It is certified that error appears in the above-identified patent and that said Letters Patent is hereby corrected as shown below:

In column 6, line 62, delete "118" and insert -- 418 --, therefor.

Signed and Sealed this
Thirteenth Day of March, 2012

David J. Kappos
*Director of the United States Patent and Trademark Office*